United States Patent [19]
Roewer

[11] Patent Number: 5,734,915
[45] Date of Patent: Mar. 31, 1998

[54] METHOD AND APPARATUS FOR COMPOSING DIGITAL MEDICAL IMAGERY

[75] Inventor: Paul H. Roewer, Garland, Tex.

[73] Assignee: Eastman Kodak Company, Rochester, N.Y.

[21] Appl. No.: 332,574

[22] Filed: Oct. 31, 1994

Related U.S. Application Data

[63] Continuation of Ser. No. 982,388, Nov. 25, 1992, abandoned.

[51] Int. Cl.⁶ ..................................................... G06F 3/00
[52] U.S. Cl. ........................... 395/773; 395/340; 364/922
[58] Field of Search ................................. 395/326–358, 395/804, 924, 200.01, 200.09, 773; 128/920, 922; 364/224.5, 224.6, 922, 922.2, 922.3

[56] References Cited

U.S. PATENT DOCUMENTS

| | | | |
|---|---|---|---|
| Re. 34,476 | 12/1993 | Norwood | 395/804 X |
| 4,862,389 | 8/1989 | Takagi | 395/340 |
| 4,945,476 | 7/1990 | Bodick et al. | 395/924 X |
| 5,005,126 | 4/1991 | Haskin | 395/200.01 X |
| 5,146,556 | 9/1992 | Hullot et al. | 395/348 |
| 5,157,763 | 10/1992 | Peters et al. | 395/340 |
| 5,237,648 | 8/1993 | Mills et al. | 395/328 |
| 5,253,362 | 10/1993 | Nolan et al. | 395/773 |
| 5,321,807 | 6/1994 | Mumford | 395/340 |
| 5,341,293 | 8/1994 | Vertelney et al. | 395/349 |
| 5,367,623 | 11/1994 | Iwai et al. | 395/340 |
| 5,579,471 | 11/1996 | Barber et al. | 395/326 |

*Primary Examiner*—John E. Breene
*Attorney, Agent, or Firm*—William F. Noval; G. Michael Roebuck

[57] ABSTRACT

A process for translating a set of point and click operations in a window oriented environment into a set of ACR-NEMA commands for formatting film pages of medical images. In particular, the software modules that comprise the invention relate to processes for interfacing a non-programmer user with a digital computer to produce a desired group of medical images, selected from stored images. The new group of images can be edited, annotated, and arranged by the user. The process then converts the image data into an industry standard format which can be transmitted to printers or storage on a network. A process for automatically generating a set of ACR-NEMA commands for formatting film pages of medical images, based upon the intrinsic characteristics of the images, defined as a set of ACR-NEMA elements.

2 Claims, 25 Drawing Sheets

Microfiche Appendix Included
(7 Microfiche, 648 Pages)

| | |
|---|---|
| TAB | • SELECTS THE NEXT FRAME CONTAINING IMAGE INFORMATION.<br>• EMPTY FRAMES ARE NOT SELECTED. |
| ⬆<br>⬇ | • SELECTS FRAMES IN THE NEXT ROW ABOVE OR BELOW THE CURRENTLY SELECTED FRAME...<br>• THESE MOVEMENTS DO NOT REQUIRE FRAMES TO CONTAIN AN IMAGE. |
| ⬅<br>➡ | • SELECTS FRAMES TO THE LEFT OR RIGHT OF THE CURRENTLY SELECTED FRAME...<br>• THESE MOVEMENTS DO NOT REQUIRE FRAMES TO CONTAIN AN IMAGE. |

FIG. 3

Click and hold on PDS image

PDS image remain in place

Dragging the image outline

When image outline snaps into PCW frame:
- Image appears in PCW frame
- PDS window closes

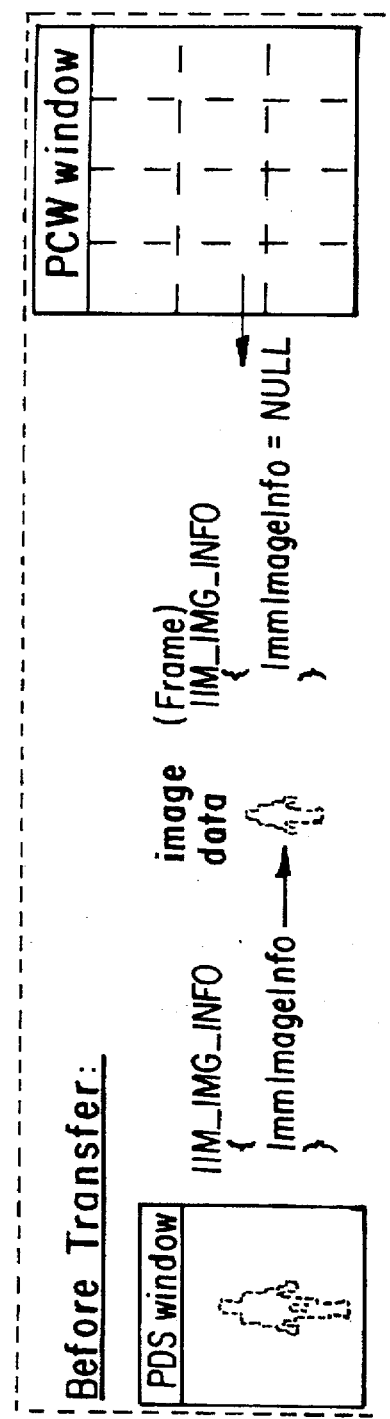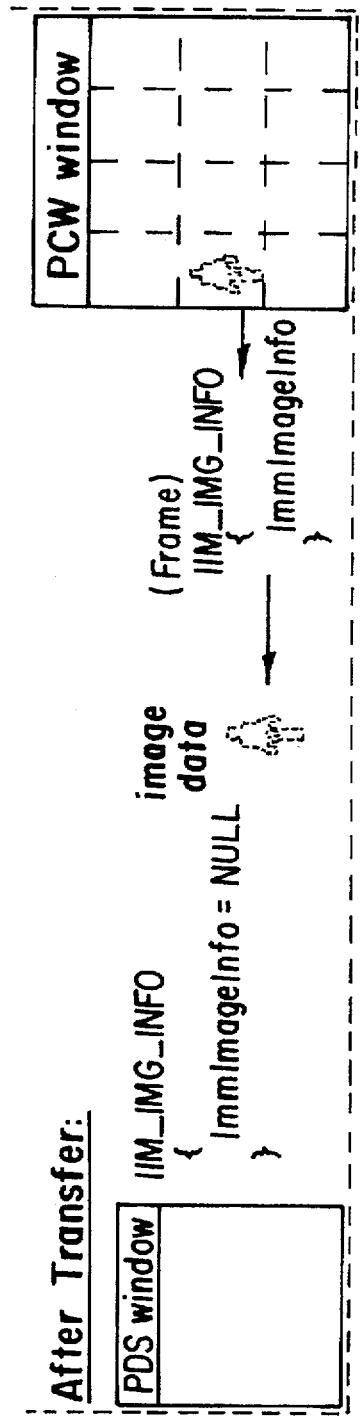
FIG. 12A
FIG. 12B

```
UPPS_FORMS
{
#   FORM_DEF : camera-type Modality Manufacturer ID
#   PADDING : left right top bottom
#   FONT : Font FontSize Def Units
TEXT : row col font fontSize AN Object              print format    Units Def FORM_DEF : XLP_100      MR      GE
PADDING : 0     160     16      0
FONT : 0        14              1
TEXT : TOP      LEFT            0       0       "0028,1051"     "Width=%s"      0       "???"
TEXT : TOP      LEFT+13         0       0       "0028,1050"     "Level=%s"      0       "???"
TEXT : TOP+1    LEFT            0       0       "0020,0010"     "Stu:%s"        0       "???"
TEXT : TOP+2    LEFT            0       0       "0020,0011"     "Ser:%s"        0       "???"
TEXT : TOP+3    LEFT            0       0       "0020,0013"     "Img:%s"        0       "???"
TEXT : TOP+1    RIGHT-31        0       0       "0008,0070"     "%s"            0       "???"
TEXT : TOP+2    RIGHT-20        0       0       "0008,0080"     "%s"            0       "???"
TEXT : TOP+4    RIGHT-20        0       0       "0008,0020"     "%s"            0       "???"
TEXT : TOP+4    RIGHT-9         0       0       "0008,0030"     "%s"            0       "???"
TEXT : TOP+6    RIGHT-20        0       0       "0010,0010"     "%s"            0       "???"
TEXT : TOP+7    RIGHT-20        0       0       "0010,0020"     "%s"            0       "???"
TEXT : TOP+9    RIGHT-20        0       0       "0010,0040"     "%s"            0       "???"
TEXT : TOP+9    RIGHT-17        0       0       "0010,1010"     "%s"            0       "???"
TEXT : TOP+9    RIGHT-11        0       0       "0010,1030"     "%s kg"         0       "0"
TEXT : TOP+18   RIGHT-20        0       0       "0018,0080"     "TR: %s"        0       "???"
TEXT : TOP+19   RIGHT-20        0       0       "0018,0081"     "TE: %s"        0       "???"
TEXT : TOP+21   RIGHT-20        0       0       "0028,0010"     "%sx"           0       "???"
TEXT : TOP+21   RIGHT-16        0       0       "0028,0011"     "%s"            0       "???"
TEXT : TOP+23   RIGHT-20        0       0       "0021,0027"     "FOV: %s"       0       "???"
TEXT : TOP+24   RIGHT-20        0       0       "0018,0050"     "Thk: %s"       0       "???"
```

FIG. 17A

```
FORM_DEF : XLP_100        MR    GE
PADDING : 50    42    50  16
FONT : 0        14    1

FORM_DEF : XLP_100        MR    GE
PADDING : 0     160   16  0
FONT : 0        14    1
TEXT : TOP              CENTER    0    0    "0008,0080"    "%s"       0    "???"
TEXT : TOP+1            LEFT      0    0    "0010,0010"    "%s"       0    "???"
TEXT : TOP+1            LEFT+30   0    0    "0010,1010"    "%s"       0    "???"
TEXT : TOP+1            CENTER    0    0    "0010,0020"    "%s"       0    "???"
TEXT : TOP+2            LEFT      0    0    "0008,0020"    "%s"       0    "???"
TEXT : TOP+3            LEFT      0    0    "0008,0030"    "%s"       0    "???"
TEXT : TOP+5            LEFT      0    0    "0020,0013"    "SCAN%s"   0    "???"
TEXT : BOTTOM-6         LEFT      0    0    "0018,0082"    "Tl: %s"   0    "???"
TEXT : BOTTOM-5         LEFT      0    0    "0018,0050"    "Thk: %s"  0    "???"
TEXT : BOTTOM-6         RIGHT-6   0    0    "0028,1051"    "W %s"     0    "???"
TEXT : BOTTOM-5         RIGHT-6   0    0    "0028,1050"    "C %s"     0    "???"
```

A Sample Template
Below is a sample text template definition. It completely defines a usable template:

```
FORM_DEF: XLP_100  CT  "GE Signa"
PADDING: 0  164  16  84
FONT: 0  14

TEXT:TOP         LEFT       0  "0008,0080"  "%s"            0"???"0         #"InstitutionID"
TEST:TOP+1       RIGHT-20   0  "0008,0020"  "Date:%s"       0"???"0         #"Study Date"
TEXT:TOP+2       RIGHT-20   0  "0008,0030"  "Time:%s" 0"???"0 #"Study Time"
TEXT:BOTTOM-6    LEFT       0  "0010,0010"  "%s"            0"???"0         #"Patient Name"
TEXT:BOTTOM-5    LEFT+2     0  "0010,0020"  "ID:%s"         0"???"0         #"Patient ID"
TEXT:BOTTOM-5    LEFT+15    0  "0010,0040"  "Sex:%s"        0"???"0         #"Patient Sex"
TEXT:BOTTOM-4    LEFT+2     0  "0010,1010"  "Age:%s"        0"???"0         #"Patient Age"
TEXT:BOTTOM-4    LEFT+15    0  "0010,1030"  "Wt:%skg"       0"0"0           #"Patient Weight"
TEXT:BOTTOM-2    LEFT       0  "0080,0060"  "Modality:%s"   0"OT"0          #"Modality"
TEXT:TOP+3       RIGHT-20   0  "0020,0010"  "Study:%s"      0"???"0         #"Study"
TEXT:TOP+4       RIGHT-20   0  "0020,0011"  "Series: %s"    0"???"0         #"Series"
TEXT:TOP+5       RIGHT-20   0  "0020,0013"  "Image: %s"     0"???"0         #"Image"
TEXT:TOP+8       RIGHT-20   0  "0000,0000"  "Window."       0"???"0         #
TEXT:TOP+9       RIGHT-18   0  "0028,1050"  "Center:%s"     0"???"0         #Window Center
TEXT:TOP+10      RIGHT-18   0  "0028,1051"  "Width:%s"      0"???"0         #Window Width
TEXT:TOP+13      RIGHT-20   0  "0018,0060"  "KVP:%sKV"      0"???"0         #KVP
TEXT:TOP+14      RIGHT-20   0  "0018,1151"  "Exp Rate:%smA" 0"???"0         #"Exposure Rate"
TEXT:TOP+15      RIGHT-20   0  "0018,0050"  "Thk:%smm"      0"???"0         #"Slice Thickness"
TEXT:TOP+16      RIGHT-20   0  "0018,1120"  "GT:%smm"       0"???"0         #"Gantry Tilt"
TEXT:TOP+17      RIGHT-20   0  "0018,1150"  "ET:%sms"       0"???"0         #"Exposure Time"
TEXT:BOTTOM-7    RIGHT-20   0  "0028,0010"  "Rows:%s"       0"???"0         #"Rows"
```

FORM DEF Definitions

| FORM_DEF : | XLP_100 | CT | "GE Signa" |
|---|---|---|---|
| ① | ② | ③ | ④ |

① Identifier
② Camera
③ Modality
④ Manufacturer

FIG. 19B

PADDING Definitions

| PADDING | 0 | 164 | 16 | 84 |
|---|---|---|---|---|
| ① | ② | ③ | ④ | ⑤ |

① Identifier
② Left Padding
③ Right Padding
④ Top Padding
⑤ Bottom Padding

FIG. 19C

FONT Definitions

| FONT: | 0 | 14 | 1 |
|---|---|---|---|
| ① | ② | ③ | ④ |

① Identifier
② Font
③ Font Size
④ Default Units of Measure

FIG. 19D

TEXT Definitions

| TEXT: | TOP | LEFT | 0 | 0 | "0008,0080" | "INSTITUTION: %S" | 0 | "???" | 0 | #INST. ID |
|---|---|---|---|---|---|---|---|---|---|---|
| ① | ② | ③ | ④ | ⑤ | ⑥ | ⑦ | ⑧ | ⑨ | ⑩ | ⑪ |

① Identifier
② Row
③ Column
④ Font
⑤ Font Size
⑥ Item ID
⑦ Print Format
⑧ Unit of Measure
⑨ Default Value
⑩ Presentation
⑪ Comment

FIG. 19E

METHOD AND APPARATUS FOR COMPOSING DIGITAL MEDICAL IMAGERY

This application is a continuation of U.S. patent application Ser. No. 07/982,388 filed on Nov. 25, 1992, by Roewer, entitled "A Method and Apparatus for Composing Digital Medical Imagery," now abandoned.

COPYRIGHT NOTIFICATION

A potion of the disclosure of this patent document contains material which is subject to copyright protection. The copy owner has no objection to the facsimile reproduction by anyone of the patent document or the patent disclosure, as it appears in the Patent and Trademark Office patent file or records, but otherwise reserves all copyright rights whatsoever.

TRADEMARK NOTIFICATION

IARS, MIG, and PDS are registered trademarks of Vortech Data, Inc. Apple and Macintosh are registered trademarks of Apple Computer, Inc. OS/2 and PRESENTATION MANAGER are the registered trademarks of IBM Corp. WINDOWS is the trademark of Microsoft, Corp. IMAGELINK is the registered trademark of Eastman Kodak Company.

Software Microfiche Appendix

A source code listing for the software applications described herein are contained in a software microfiche appendix consisting of 7 microfiche consisting of 648 frames.

Additional Materials Incorporated by Reference

The following documents are hereby incorporated by reference:

Eastman Kodak Company, *Improve Image Consistency for Intensive Care*. Health Sciences Division, Rochester, 1992.

Eastman Kodak Company, *Digital Radiography Using Storage Phosphors*. Health Sciences Division, Rochester, 1992.

Apple Computer, Inc., *Human Interface Guidelines: The Apple Desktop Interface*. Reading: A-W, 1987

Apple Computer, Inc., *Technical Introduction to the Macintosh Family*. Reading: A-W, 1987.

Apple Computer, Inc., *Programmer's Introduction to the Macintosh Family*. Reading: A-W, 1991.

Apple Computer, Inc., *Inside Macintosh*, Volumes I-V. Reading: A-W, 1985–1988.

Apple Computer, Inc., *Inside Macintosh*, Volume VI Reading: A-W, 1985–1991. B. Kernighan and D. Richie, *The C Programming Language*. Englewood Cliffs, P-H, 1988.

Symantec Corp., *THINK C User's Manual*. Cupertino, Calif. 1989.

Symantec Corp. *THINK C Standard Libraries Reference*. Cupertino, Calif., 1989.

H. Fischer, *Radiology Departments: Planning, Operation, and Management*. Ann Arbor: Edwards, 1982.

H. Huang, *Elements of Digital Radiology*. Englewood Cliffs, P-H, 1987. Seedam, Euclid, editor. *Computers in Radiology*. Springfield: Thomas, 1989.

J. Martin, K. Chapman, & J. Leben, *Systems Application Architecture: Common User Access*. Englewood Cliffs: P-H, 1991.

J. Martin, *Information Manifesto*. Englewood Cliffs: P-H, 1984.

J. Martin, *Information Engineering, Book One, Introduction*. Englewood Cliffs: P-H, 1989.

J. Martin, *Information Engineering, Book Two, Planning and Analysis*. Englewood Cliffs: P-H, 1990.

J. Grothow, SAA: *A Guide to Implementing IBM's Systems Application Architecture*. New York: Yourdon, 1991.

J. Powell, *Designing User Interfaces*. San Marcos: Microtrend, 1990.

T. DeMarco, *Structured Analysis and System Specification*. New York: Yourdon, 1979.

E. Yourdon, *Modem Structured Analysis*. New York: Yourdon, 1989.

E. Yourdon, *Techniques of Program Structure and Design*. New York: P-H, 1975.

R. Pressman, *Software Engineering*, 3 ed. New York: McGraw, 1992.

S. Melior, and P. Ward, *Structured Development for Real-Time Systems*, Vol. One, *Introduction and Tools*. New York: P-H, 1985.

S. Mellor, and P. Ward, *Structured Development for Real-Time Systems*, Vol. Two, *Essential Modeling Techniques*. New York: P-H, 1985.

N. Johnson, *Advanced Graphics* in C. Berkley: Osborne, 1987.

G. Sutty, and S. Blair, *Advanced Programmer's Guide to the EGA/VGA*. New York: Simon, 1988.

American College of Radiology—National Electrical Manufacturers Association Digital Imaging and Communications Standards Committee, ACR—NEMA 300-1988: *Digital Imaging and Communications*, 1989.

*PDS User's Guide*, 950-00039-010B, Vortech Data, Inc., Richardson, Tex.

*PCW User's Guide*, 950-00065-010A, Vortech Data, Inc., Richardson, Tex.

*Tex Templates, Guide to ACR-NEMA 6800 Group Template Editing*, Vortech Data, Inc., Richardson, Tex.

BACKGROUND OF THE INVENTION

1. Field of the Invention

The present invention relates to the field of digital medical imagery and more particularly to the manipulation and annotation of digitized medical imagery via a window based graphic user interface presented at a medical imagery workstation.

2. Description of the Related Art

Modern hospitals and diagnostic clinics use medical imagery workstations to acquire, study, and store in archives digitized medical imagery derived from a variety of source devices or modalities. Presently many medical imagery source devices connect directly to dedicated readers, printers, and storage devices. Multiple imagery source devices may be connected via hospital information networks to output devices such as workstations, laser film printers, or optical storage devices. Dedicated imagery handling devices, however, may quickly become obsolete in the context of today's environment of rapidly changing computing technology.

Thus, dedicated Imagery Handling Systems or Future Archival and Communication Systems (PACS) are only partial solutions for cost effective health care delivery. Conventional drawing systems do not provide reversal operations that allow an operator to toggle the text, lines and symbols and see the original, unaltered image while the annotation is temporarily hidden from view. Newer PACS designs are now combining the special purpose components of different vendors. Software applications are often used to optimize the combined advantages of hardware, networks, computers, display consoles, as well as printing and storage devices. Unlike conventional dedicated hardware systems, modular software based systems can be easily adapted and upgraded as necessary to meet changing needs or to take advantage of new breakthroughs in hardware or communication technology. Thus the useful life of a modular system can be extended past that of a conventional inflexible, dedicated, special purpose systems which may quickly become obsolete.

Recent advances in computer graphics technology and enhancements in the manipulation and transmission of digital imagery data have failed to meet the needs of imagery data presentation in hospitals. Applications utilizing these recent advances are overly restrictive, allowing very little freedom and versatility. More flexible systems on the other hand, typically demand more operator intervention. Such systems require the operator to learn and remember an unwieldy set of command sequences and decision paths.

There are other problems associated with these conventional systems. User interfaces are suboptimal as to the way the user interacts, the way information is displayed, and the way data is input. Conventional workstations generally present inconsistent information in a confusing format, and often do not provide meaningful feedback to the operator. Conventional drawing systems do not provide reversal operations that allow an operator to toggle the text, lines, and symbols and see the original unaltered image while the annotation is temporarily hidden from view. Conventional systems also require a large training investment to teach operators to use conventional pull-down menu and command options. Commands require many keystrokes, long and illogical dialog, and can produce tension. These conventional systems do not help prevent user errors and but instead tend to create them.

Many conventional systems utilize text-oriented displays which force the user to work with ambiguous or irrelevant controls, or even partially visible information. Conventional screen paging techniques resemble juggling several books rather than neatly arranging and sorting pages like on a desk top. All these problems led to inefficiency caused by operator stress and tension.

Most conventional systems do not use pointer devices, soft keys or special function keys. There is no capability provided for customizing the conventional system for user or situation preferences. Work patterns are thus strictly defined and cannot be modified by the user. Modification requires alteration of the underlying computer program. Moreover, conventional user interfaces are not organized by user tasks. Conventional pull-down menu systems generally require a workstation operator to go through a long and tedious series of choices selected from a long list in a seemingly illogical hierarchy.

Although, conventional menu systems do not require operators to become familiar with all possible command key words and parameter values, conventional menu systems perform more slowly than text oriented command line entry systems. Menu systems can require hundreds of combinations of valid input values and provide numerous opportunities for invalid inputs. Conventional menus can require excessive time to sequence through the multiple levels of command pull-down menus. Thus, conventional menu item selection can be problematic as it requires excessive time, thought, and mental recall that lead to operator errors. Errors cannot be tolerated in life threatening situations. In many instances, medical imagery is critical and necessary for immediate diagnosis. Time is of the essence when human life is at stake and the associated tensions can be high. There is no time for mistake or delay. It is therefore necessary to have a quick and simple operator interface to manipulate medical imagery.

Another disadvantage of large conventional menu systems is that the operator may not be able to see any intermediate progress. Some designers have attempted to solve these problems with icons or soft keys that clutter the work station display screen. A recent attempt to reduce the distraction due to clutter uses invisible windows. Invisible windows are problematic, however, because they require the operator to remember the pull-down menu activation point locations.

Moreover, workstation operators while experts in their chosen medical field, are often not computer-literate. These operators (hospital technologists, radiologists, attending or consulting physicians) typically focus on the tasks of accessing, viewing, displaying, and printing medical imagery. Operators select a patient's images to compose and study for medical diagnosis. Operators select imagery and may choose to print, store or edit and annotate the imagery. Thus a simple and fast interface is needed to help increase speed, provide for an efficient work flow, and facilitate use by the non-computer-literate operators.

SUMMARY OF THE INVENTION

The present invention presents an apparatus and method to solve many of the problems with conventional systems. Thus it is an object of the present invention to provide a graphic user interface for medical imagery which is easy to learn and simple to use, thus resulting in fewer errors under stressful conditions. It is another object of the present invention to provide for a more consistent display format with more meaningful feedback. It is yet another object of the present invention to provide for easy reversal of operator editing actions at a workstation. It is yet another object of the present invention to provide increased speed and efficiency in imagery manipulation. It is yet another object of the present invention to provide protection against user errors at the workstation. Another object of the present invention is to provide window oriented commands organized by type of action. It is another object of the present invention to provide an information display where all necessary information is visible.

It is another object of the present invention to provide controls which are unambiguous and intelligible. It is another object of the present invention to display only information relevant to the task at hand. It is yet another object of the present invention to provide windows which allow manipulation of stacks of imagery work to act the same as if the images were laid on a desk top. It is another object of the present invention to provide an uncluttered display at the workstation. It is yet another object of the present invention to provide data input via mouse, soft keys, special function keys and other user input devices. It is another object of the present invention to provide an interface to multiple vendors' printers, both locally and remotely. It is another object of the present invention to provide the ability for a non-computer-literate workstation operator to easily choose, arrange, annotate, and edit medical source imagery.

It is another object of the present invention to provide a method for communicating with the operator and controlling the layout of selected patient images to be arranged within the workstation window. It is another object of the present invention to provide a method to create medical imagery printer parameters and to create American College of Radiology—National Electrical Manufacture's Association (ACR-NEMA) commands from these parameters. It is another object of the present invention to gather specific user input operations within dialog boxes. It is another object of the present invention to provide sealed and matching fonts for external devices. It is another object of the invention to provide management functions to perform, define, and maintain frame information within the workstation imagery composition window.

It is another object of the present invention to provide functions to select a printer, to change default printing and display parameters, to verify proper printer selection, and to control printing of imagery data from the workstation. It is another object of the present invention to provide custom scout lines in imagery windows. It is another object of the present invention to provide functions to access and manipulate stored text template information. It is another object of the present invention to provide the ability to print composed medical images on a variety of different vendors' laser film printers. It is another object of the invention to transmit composed medical images in an industry standard communication format. It is another object of the invention to provide a display of a simulated work place via a graphics user interface thus providing a combination of computer simulated tools to replace manual radiology techniques. It is another object of the invention to integrate critical decision activities.

The foregoing objects, features and advantages, along with many other objects, features and advantages, of the present invention will become apparent, from the following illustration of a preferred embodiment of the present invention.

The present invention, a Print Composition Workshop (PCW), is a modular software based system that operates as an optional feature within a larger picture archival and communication system such as the PDS environment. The present invention provides the tools to create a "What-You-See-Is-What-You-Get" composition containing medical diagnostic images, text, and graphics items that can be sent to either a hard copy device for printing or to a storage device for later retrieval.

In one aspect of the present invention, a method is presented for editing medical diagnostic imagery comprising the steps of: loading a medical diagnostic image to a workstation; presenting a set of graphic user interface commands at the workstation to allow an operator to edit the medical diagnostic image by manipulation of image objects; accepting and processing said graphic user interface commands upon selection by an operator at said workstation; transforming said operator selected graphic user interface input commands into a set of commands for formatting medical diagnostic imagery; and transmitting said set of transformed commands over a network for printing, display, or storage of said edited imagery.

In another aspect of the present invention a method is presented for printing medical diagnostic imagery comprising the steps of: reading a set of default values; and generating a set of medical diagnostic imagery transfer commands based on the default values.

In another aspect of the present invention a method is presented for reducing the amount of storage required to store a annotated medical image comprising the steps of: determining whether a medical image data byte has unused bits; and if said medical image has unused bits, coding a single bit in the unused portion to indicate whether a pixel represented by the data byte should be highlighted to indicate an annotation overlaid on the image.

In yet another aspect of the present invention a method is presented for composing a medical diagnostic image comprising the steps of: presenting a set of graphical interface commands at a workstation; displaying a medical image at a workstation as the image will be printed; accepting graphical interface commands selected at the workstation; manipulating the image display in response to the selected graphical interface commands; and annotating the image according to the selected graphical interface commands.

In another aspect of the present invention a method is presented further comprising the step of reversing the effect of the image manipulation or image annotation command in response to a reversal command or in response to the tools in the annotation or image palettes.

In another aspect of the invention, an apparatus is presented for editing medical diagnostic imagery comprising: a medical diagnostic image a workstation; a means for presenting a set of graphic user interface commands on the workstation to allow an operator to edit the medical diagnostic image by manipulation of image objects; a means for accepting and processing said graphic user interface commands upon selection by an operator at said workstation; a means for transforming said operator input commands into a set of command for formatting medical diagnostic imagery; and a means for transmitting said set of transformed commands over a network for printing, display or storage.

In mother aspect of the present invention an apparatus is presented for printing medical diagnostic imagery comprising: a means for reading a set of default values; and a means for generating a set of medical diagnostic imagery transfer commands based on the default values.

In another aspect of the present invention an apparatus is presented for reducing the amount of storage required to store a annotated medical image comprising: a means for determining whether an medical image data byte has unused bits; and a means for coding a single bit in the unused portion to indicate whether a pixel represented by the data byte should be highlighted to indicate an notation overlaid on the image.

In another aspect of the present invention an apparatus is presented for composing a medical diagnostic image comprising a means for presenting a set of graphical interface commands at a workstation; a means for displaying a medical image at a workstation as the image will be printed; a means for accepting graphical interface commands selected at the workstation; a means for manipulating the image display in response to the selected graphical interface commands; and a means for annotating the image according to the selected graphical interface commands.

In another aspect of the present invention an apparatus is presented further comprising: a means for reversing the effect of the image manipulation or image notation command in response to a reversal command or in response to the tools in the notation or image palettes.

BRIEF DESCRIPTION OF THE DRAWINGS

FIG. 3 is a table illustrating the special use keys for quickly moving around to the PCW frames in an example of a preferred embodiment of the present invention.

FIGS. 12A–12B illustrates a typical PCW window before and after image transfer in an example of a preferred embodiment of the present invention.

FIG. 17 illustrates a portion of sample template data in a typical configuration file in an example of a preferred embodiment of the present invention.

FIGS. 19A–19E illustrates a sample template definition, with descriptions of each data type in an example of a preferred embodiment of the present invention.

DETAILED DESCRIPTION OF A PREFERRED EMBODIMENT

Overview

The present invention will be further clarified by consideration of the following examples, which are intended to be purely exemplary of the invention.

Figure 1:
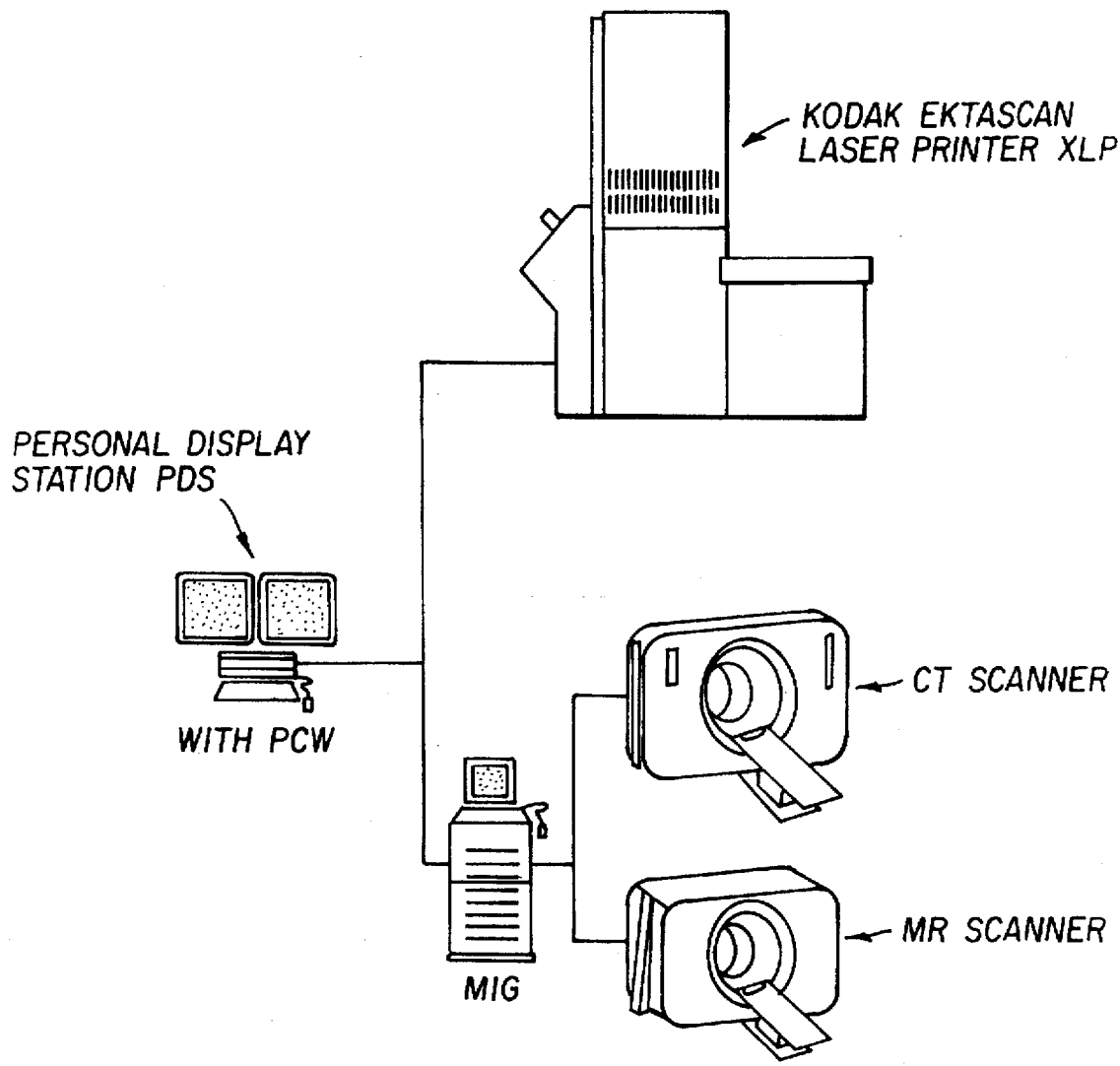
FIG. 1 is a pictorial representation of typical PDS-PCW system configuration in an example of a preferred embodiment of the present invention.

A preferred embodiment of the present invention functions to quickly and easily generate hard copy sets of annotated medical imagery for diagnosis, research, reports, or archives. A preferred embodiment of the present invention is well suited for embedding within a broader application program such as the Personal Display System (PDS), available from Vortech Data, Inc., Richardson, Tex. (214) 994–1200. The PDS is a general purpose Picture Archival and Communication System (PACS). In a preferred embodiment, the apparatus and method of the present invention includes software modules that run within a broader application such as PDS. FIG. 1 is an illustrative example of a preferred embodiment of present invention embedded in such a general purpose PACS such as the Vortech PDS.

In a preferred embodiment, the PDS workstation is located in a critical care area and a medical image film formatter is located in a radiological department for printing images on film. The workstation and formatter are linked via an electronic network to provide image capture and retrieval, image enhancement, soft copy display, and film printing. Images can be previewed and adjusted at the workstation before printing. The workstation displays the image as it will look when printed. Thus, in a preferred embodiment, the workstation display is a "what you see is what you get" ("WYSIWYG") display. Workstation operators can view imagery, compose, and start printing before leaving a critical care area instead of waiting until return to the radiology department to process the film. Workstation operations, editing, viewing and composing and printing focus on the presentation and annotation of medical imagery. The operator is unaware of the underlying apparatus and method which comprises the preferred embodiment of the present invention.

A workstation operator does not have to "stop and think" about operating the PCW controls, but can maintain a high level of concentration in critical or life threatening situations. A preferred embodiment of the present invention provides a simulated view of medical images that resembles actual film images on a real viewing frame or desk space. The operator manipulates and edits the images using a computer simulation of a radiologist's light table at the workstation. Like a real workshop, a preferred embodiment provides an operator with several kinds of visual feedback. The operator sees the operation taking place, action upon single or multiple images or objects, pointer and target positions, and highlighting of selected options. Tasks are accomplished by interacting with a combination of graphic user interfaces.

Examples of Operating Modes in a Preferred Embodiment

It may be initially helpful to provide some operational examples of the preferred embodiment. These examples include two modes of the preferred embodiment: the Auto Print and Print Composition Workshop operating modes, both of which generate composed PCW documents and submit them to the print routines for printing. Initially, an operator at a PDS workstation uses PDS to recall and open patient ties stored in local PDS memory. The operator may then choose either of the PCW modes, Auto Print or PCW.

Auto Print Mode

In an example of a preferred embodiment of the present invention, Auto print mode is an abbreviated form of the Print Composition mode. Before invoking the Auto Print command, the operator must first load a patient's image data from the local database. The operator can change the settings prior to printing by selecting PCW defaults on the PCW pull-down menu. A target printer must be selected via the Select Printer command on the PCW pull-down menu. The Open Command on the File pull-down menu activates the Open dialog box so that the operator can specify the PDS patient images to display. After the PDS reads and displays the patient images, the operator can perform any PDS operation for image windows. These operations include window, level, flip, rotate, text insertion, and annotations. After adjusting the new PCW images to the operator's preference, he selects Auto Print on the PCW pulldown menu. The PCW Print Setup window opens to enable the operator to verify or change the page format. Depending on how the operator wants to organize the frames to print, the operator can select either Auto Load or Preload on the Print dialog.

In an example of a preferred embodiment of the present invention, Auto Load sends the topmost series of PDS images to the target printer. Preload moves PDS images into the Auto Print Worksheet for preview and editing or for proofing the format and appearance. The operator selects Auto Print on the PCW pulldown menu to send the current PDS images to the target laser printer for printing in the order they are displayed. PCW applies the current page settings for composing the appearance of the images on film. After printing begins, printing may be terminated by pressing the ESC key. When the current page is finished, printing stops.

In an example of a preferred embodiment of the present invention, the operator may select Preload on the PCW Print Setup dialog to open the Auto Print Worksheet window. This selection fills the window with preferred images. The Drag tool may be used to drag images into the window or the Auto Load option can be used to load images. A pointer device may be used to click on a PDS image to place that image into the first empty frame in the worksheet. The operator may print the worksheet by selecting Print on the File pulldown menu.

Print Composition Workshop Mode

In an example of a preferred embodiment of the present invention, before invoking the New PCW command, the operator preferably loads a patient's image data from the local database and preferably has a target printer selected. The operator can do this with the Open command on the File pulldown. It activates the Open dialog box wherein the operator can specify the patient images to display. If no target printer is selected, the operator uses Select Printer on the PCW pulldown menu. The operator can change the settings for new PCW windows on the PCW pulldown.

In an example of a preferred embodiment of the present invention, the operator selects New PCW on the PCW pulldown to open a new Print Composition Window. This is the window which represents the final film page printed by the target printer. This PCW window originally opens with a frame grid. The grid layout of rows and columns is based on page settings that the operator made via the PCW Defaults on the PCW pulldown menu. This grid represents the individual frames that will contain the various components (images, overlays) for the new composition. The operator places all images and composed graphics in this window exactly how the operator wants each individual frame to be printed on the film page. What the operator sees (displayed) is what he gets (printed). ("WYSIWYG")

Preferably, the operator can change the number of images per page through the Arrange pull-down menu. If the operator selects a new layout, a new grid is drawn on the Print Composition Window. Each frame is selectable by a pointer device click and represents a local drawing area when selected. To insert an image into a frame, the operator selects the Drag tool. The operator may either use a key-click combination to load the selected image into the first empty frame, or the operator may simply drag the image to a desired frame and releases it. The image is then transferred into the frame and the PDS window is closed. To put an image back into a PDS window, the operator drags the image outside of the PCW window and releases it. A PDS window opens and the image is restored. Images may also be automatically inserted using Auto Load Images on the PCW pulldown. Auto Load fills all the PCW frames with PDS images.

In an example of a preferred embodiment of the present invention, the operator can perform any drawing operation (lines, circles) by selecting the appropriate tool from either of the PDS palettes and using the pointer device. The drawing area is clipped to fit within the selected frame so it cannot draw into adjacent frames. The operator can perform all allowed PDS image operations in the PCW as well by selecting the desired tool from either palette and then selecting a frame to work in.

In an example of a preferred embodiment of the present invention, when the PCW window composition is complete, the operator can perform any of the following functions: select Print on the File pulldown to print the active PCW window; select Auto Print as described previously; or select Close on the File pulldown to close the active window.

EXAMPLE OF A PREFERRED EMBODIMENT

Many modern hospitals or treatment centers are geographically distributed and need to use all available types of communication networks. Many centers need to receive images from diverse and multiple modalities and transmit these images to multiple printer and storage devices. The industry has cooperated to produce a set of standard protocols. The preferred embodiment, PCW uses the American College of Radiology—National Electrical Manufacturers Association (ACR-NEMA) Digital Imaging and Communication Standard. This standard comprises a standard hardware interface, a minimum set of software commands, and a consistent set of protocols for communication. PCW hides the details of image formatting protocols and printer set up protocols from the operator, yet allows customizing for both recurring jobs or emergencies.

Figure 2:
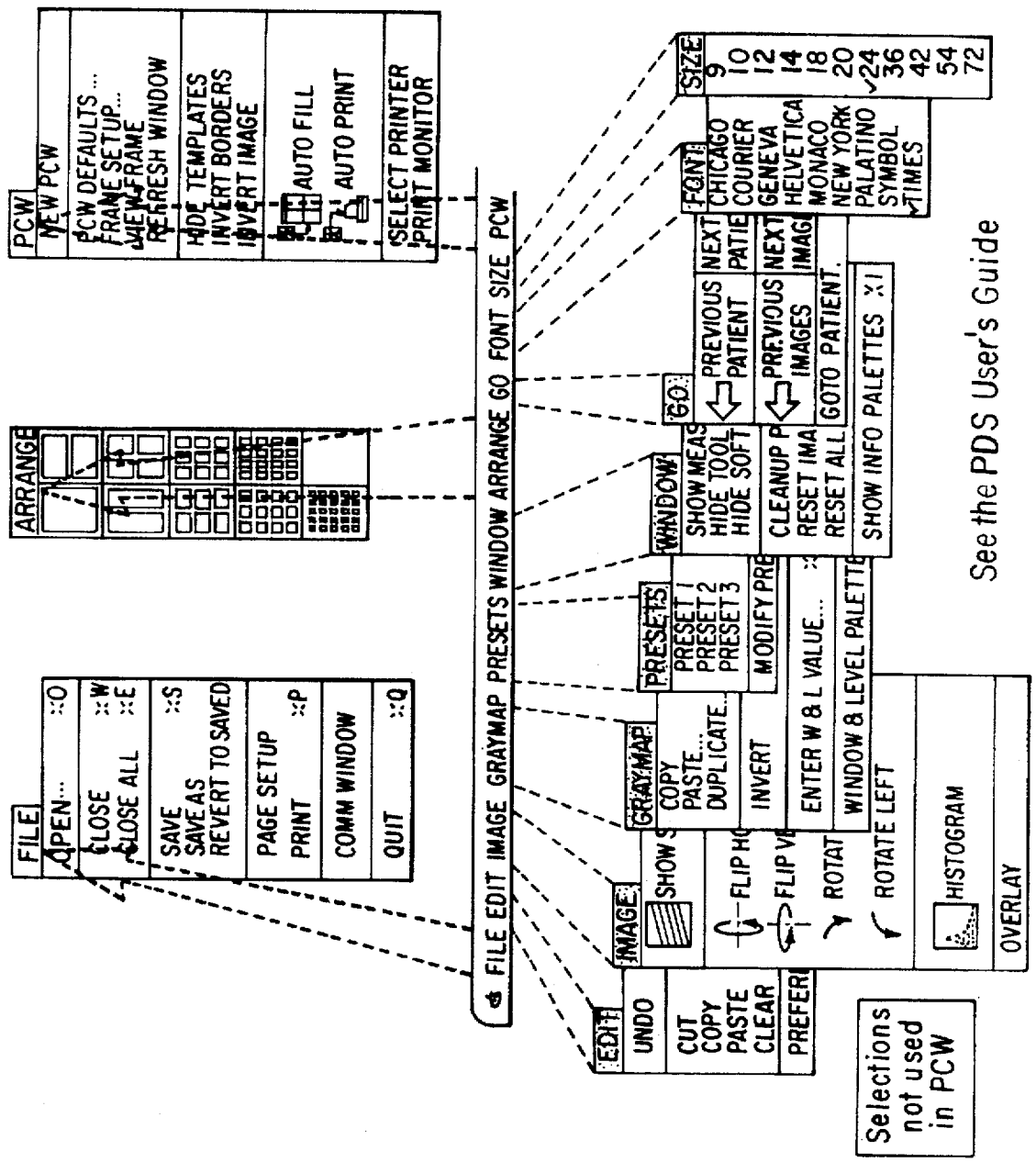
FIG. 2 is a pictorial representation of one embodiment of PCW pull-down menu bar and pull downs in an example of a preferred embodiment of the present invention.

Turning now to FIG. 2, a illustrative example of a preferred embodiment of the present invention is shown with a menu bar and pull-down selection lists. In an example of a preferred embodiment, a graphic user interface provides a simple means that a workstation operator can use to compose imagery data by selecting images, and annotating the imagery with text or graphic overlays. After composition, the operator may submit the new composition in the ACR-NEMA format for hard copy printing.

In an illustrative example of a preferred embodiment, the graphic user interface uses the windowing capabilities of the Apple Macintosh System 7 Operating System. In one example of a preferred embodiment, PDS provides the basic file system functions and environmental set up, maintenance, and customization. The result seen by the non-programmer operator includes pull-down menu bars and associated pull-downs, windows for messages, and dialog boxes. The graphical model defines the use of standard graphical cues.

An illustrative example of a preferred embodiment utilizes a pointer device, a keyboard, soft keys, dialog boxes, icons, action or information messages, postage stamps, and advanced navigation techniques. A preferred embodiment is intended for all decision intensive diagnostic imaging applications. An illustrative example of a preferred embodiment differs from the conventional environment because it provides a user-friendly approach to interacting with the system through "direct" manipulation of objects. In addition, it provides ways to perform some common operations such as recalling data, editing, and printing, more extensive application-to-application communication, and portrayal of the system as an extension of the real world, thereby masking the physical organization from the non-programmer operators.

To facilitate choosing printing preferences, an illustrative example of a preferred embodiment, provides two modes of operation, auto print and print composition. The Auto Print mode can be used when the operator wants to print all of previously retrieved PDS imagery as they were stored in memory. When the operator wants to edit, annotate or otherwise alter the retrieved PDS images, the Print Composition mode can be chosen.

In a preferred embodiment, the Auto Print mode performs automatic printing of PDS imagery which is currently displayed at the work station. The images are printed in the order they were stored, retrieved, or displayed in the PDS window and at their current display settings (e.g. window & level). In a preferred embodiment, the workstation operator may choose to print all the displayed images sequentially or preload a new film page with a desired selection of images.

In a preferred embodiment, the print composition mode provides a graphic user interface to enable the operator to arrange and compose new images to be printed. The non-programmer operator may combine images from different patients onto a single film. Annotation functions provided by a larger application such as provided by PDS in the PDS Tool palette provide the capability to write text and draw lines, circles, and rectangles. Annotation can be used for outlining or highlighting original imagery as it is displayed at a workstation. In a preferred embodiment, PDS functions are also available to modify the characteristics and properties of the original imagery as well.

In a preferred embodiment, the graphic user interface provides a dialog box, implemented in PDS, which steps through a patient hierarchy (patient-study-series-acquisition-images) to select patient image data. Dialog boxes are used to query the operator for input. The graphic user interface in a preferred embodiment allows selection of a target camera to produce a hard copy. The selection is based on available on-site cameras which also defines certain formatting information (film size, frame layouts available) that will be available to the composition.

In a preferred embodiment, default values are provided for composition and printing parameters. The operator can change and save these default values via a dialog box. These settings are associated with the related documents and are initialized each time the program is restarted. These default settings are applied to the graphics workstation display during imagery composition and also to the final printed page. Defaults are also applied while Auto Printing PDS images.

In a preferred embodiment, the print composition window is divided into frames. To initiate imagery composition for hard copy, the operator selects imagery displayed at the workstation and inserts or drags the selected image into a frame. The dragging tool in the Tool palette provides the means for dragging a PDS image into a print composition window frame. A preferred embodiment of the present invention allows the work station operator to drag or insert any displayed image into a frame, remove imagery from a frame, or transfer the image to another frame. Auto loading facilitates automatic insertion of images into a print composition frame. The auto loading format or layout is prescribed by parameters set up by the Arrange function.

Once the images have been placed into the Print Composition Workshop ("PCW") window, each frame's parameter values may be individually selected or changed via a Dialog box. In a preferred embodiment, PCW pull-down menus and PDS pull-down menus are used together to manipulate the appearance of images as well the position of image specific information (scout lines, templates) in any particular PCW window frame.

In a preferred embodiment, the graphic user interface of the present invention extends the existing PDS interface so that a non-technical operator needs to know only a small set PCW commands. In an illustrative example of a preferred embodiment, the operator retrieves PDS images for annotation or composition.

In a preferred embodiment, the operator is provided with several kinds of input devices for communicating and directing print composition. Such devices may include a pointing device such as a mouse or trackball, a computer keyboard, soft keys formed on the display or any of the tools from the PDS Tool palettes. Other inputs devices such as light pens or any other user input device may be used as well.

In a preferred embodiment, a pointer device is the primary means of directing print composition. The pointer device may be used for pull-down menu selections, image selection and image positioning or dragging, and also for drawing shapes such as lines, rectangles, and circles on the image. The keyboard is used primarily for dialog inputs such as specifying printing parameter values or typing information into templates. Keyboard input may also be used for command and option key selection. Certain keys can be used to implement special functions, such as quickly selecting print composition window frames, or to stop printing.

In an example of a preferred embodiment, the present invention minimizes pointer device movement in order to limit travel about the display screens and make commands easier and quicker for the operator. The present invention provides for frame selection via the keyboard or pointer device. The operator can use the TAB and ARROW keys as illustrated in FIG. 3 to move the point of focus into a particular frame within a PCW window or work space of the present invention.

During Auto Print operations, the operator can interrupt image processing. The ESC key operates to stop processing PDS images after completing the current page. This feature allows the non-programmer operator to terminate the unintentional printing of all displayed PDS images.

In an example of a preferred embodiment of the present invention, the operator can write text information into the present PCW frames. When the text input mode is activated, any of the alphabetic, numeric, or special keys on the keyboard can be used to write in a selected frame. Text input is activated by an icon available in the drawing palette. In a preferred embodiment the present invention provides access to the PDS soft key pad. The soft key pad is a PDS feature that provides for high level command execution through simulated keys on the display. The buttons generally equate to existing pull-down menu commands but they are provided in the key pad interface for quicker and easier access to frequently used commands. For example pushing the Auto Fill button fills a PCW window with PDS images and pushing the Auto Print button prints all currently displayed PDS images.

Pull-Down Menu Commands

In an example of a preferred embodiment of the present invention, the set of the Pull-down Menu commands in a preferred embodiment of the present invention includes: File, Edit, Arrange, Image, Graymap, Presets, Window, Go, Font, Size and PCW pulldown menus. In a preferred embodiment, all of these commands are existing PDS commands except for the PCW pull down pull-down menus. Referring now to FIG. 12, which shows an illustration of the pull down pull-down menus, the commands are now described.

In an example of a preferred embodiment of the present invention, the Open command activates the Open dialog box. The Close command closes the current PCW window. The Save command saves modifications to the selected image in the PCW window and keeps the current PCW window active. The Print command activates the Print dialog to prompt the non-programmer operator to select printing of the current PCW document. The non-programmer operator has the opportunity to make changes to some of the printing parameters as well as the printer itself. The selected document is then sent off to be printed according to the page setup parameters. The Undo or reversal command allows the operator to reverse previous actions, such as editing and notation, taken at the workstation. There is no Undo command (unless your using this term abstractly).

Figure 4A:
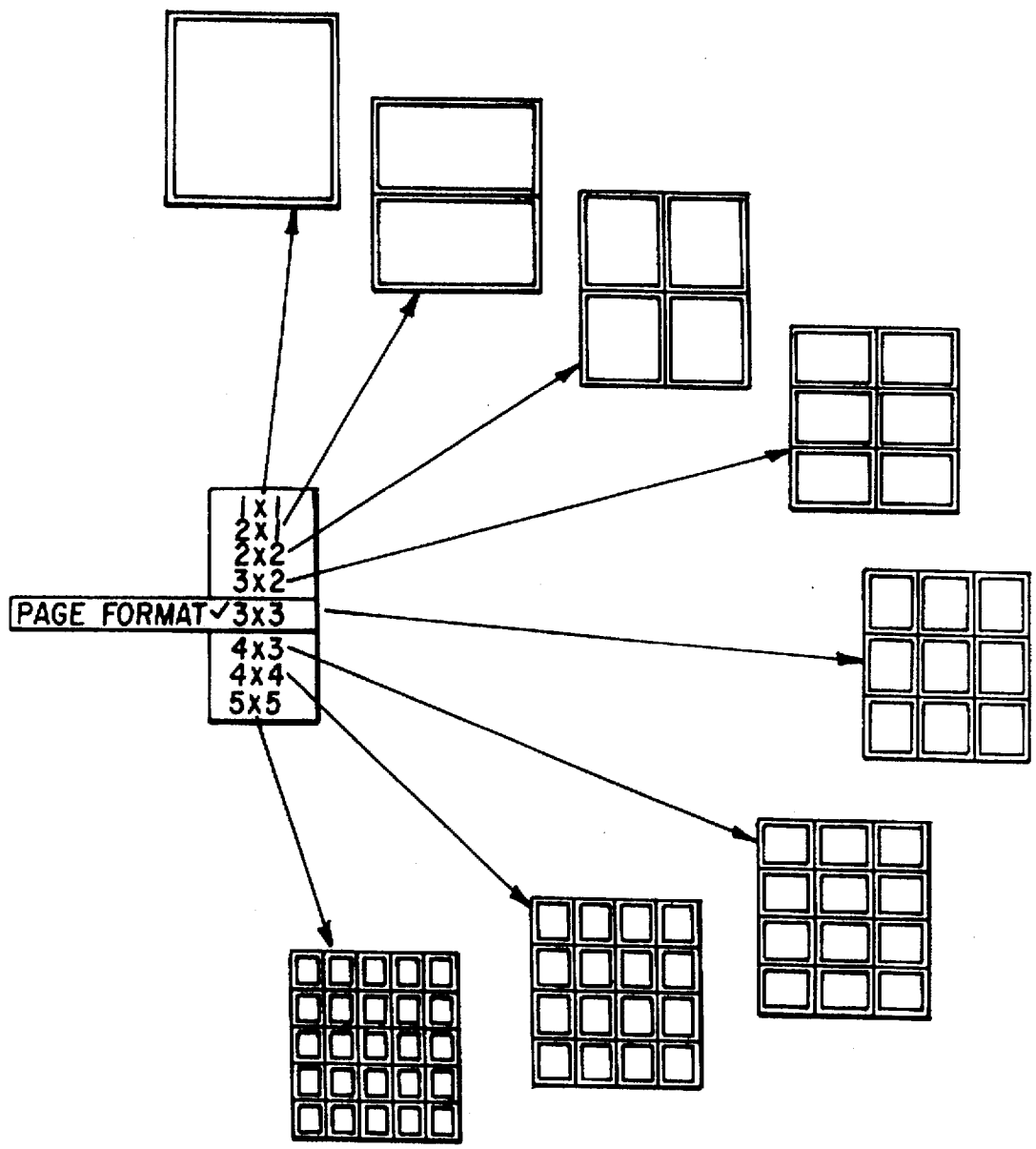
FIGS. 4A–4C illustrates the PCW frame layouts available on the Arrange dialog in an example of a preferred embodiment of the present invention.
Figure 4B:
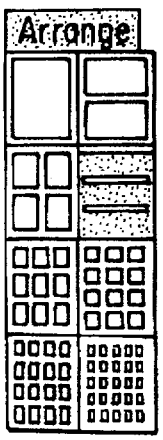
Figure 4C:
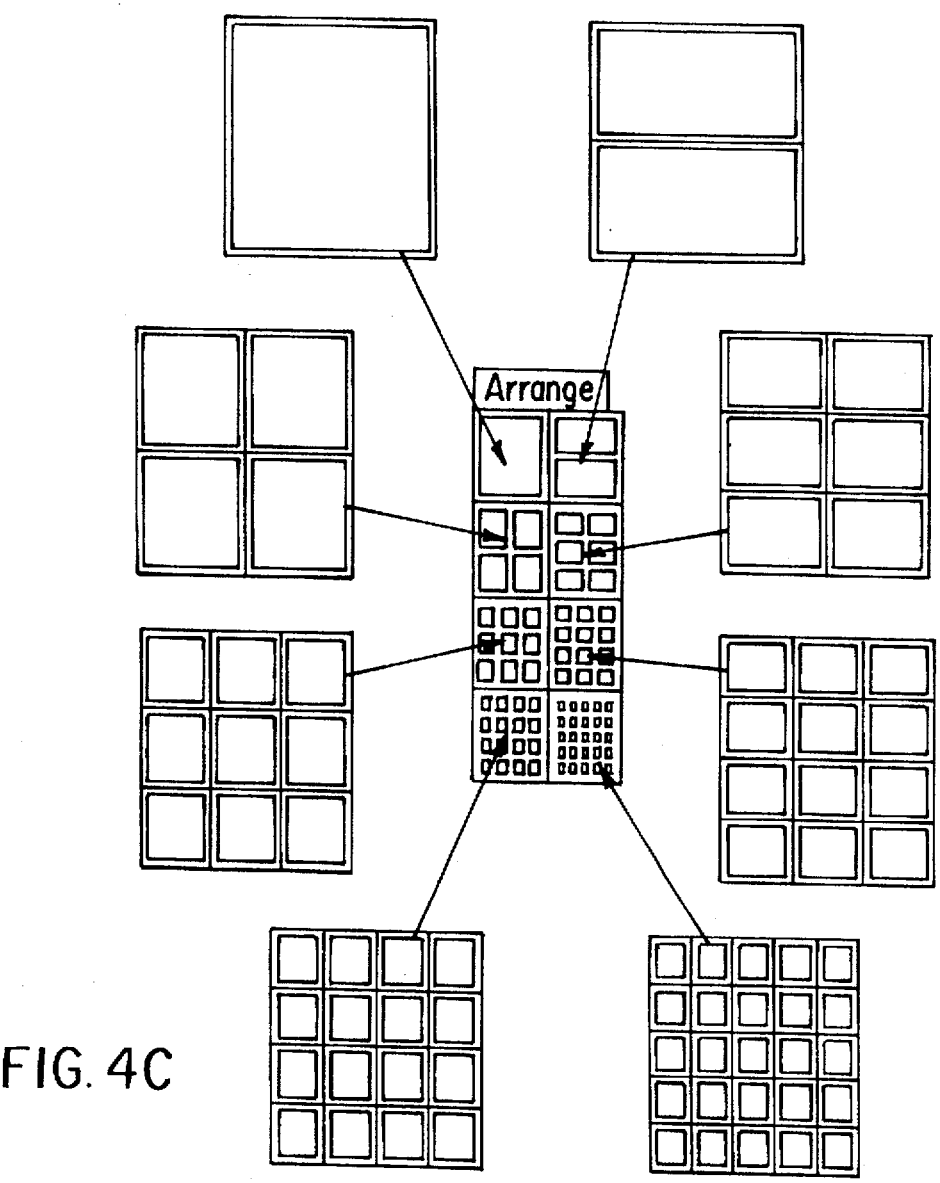

In an example of a preferred embodiment of the present invention, arrange activates the Arrange palette. FIGS. 4A–4C illustrates a preferred embodiment of the present invention composition frames available on the Arrange pull-down menu. The operator can change the number and arrangement of frames for the currently selected PCW window. The operator can also change the number and arrangement of frames that appear when a PCW window is opened by selecting PCW Defaults. This choice activates the PCW Defaults dialog that prompts the operator to change the number or layout of image frames. The number of images is determined by the capacity of the selected printing device. The format may also be changed after images are inserted into the PCW window.

PCW Pulldown Menu Options

In an example of a preferred embodiment of the present invention, new PCW creates a new PCW window with the current page settings. PCW allows for multiple windows to be displayed concurrently. PCW Defaults activates a dialog box where the operator sets new parameter values for new PCW documents and auto printing. These default parameter values are saved permanently and are restored each time the program is restarted. Frame Setup defines specific parameters for individual frames within the current PCW window. The selections can be applied to all frames within the window. View Frame displays a single frame in a single, usually larger window, so that the non-programmer operator may examine a frame in finer detail.

In an example of a preferred embodiment of the present invention, refresh Window redraws a PCW window with all its contents. Hide Templates removes text template outlines from the display. The borders can be displayed to show the template boundaries but they are not considered part of the composition and are not printed. Invert Borders inverts the current border color. Black indicates black fill and white actually means "no color" or clear. Invert Image inverts the selected frame's image's gray scale. Auto Fill fills a PCW window with currently displayed PDS images. The frames are filled sequentially with the PDS images in the order they were retrieved and displayed.

In an example of a preferred embodiment of the present invention, Auto Print sends all of the currently displayed PDS images to the printer as specified by the current settings. The operator may change the print settings via the PCW Defaults option in the PCW pull-down menu. The choice is made to "Auto Load" the displayed images to the printer or to "PreLoad". Select Printer allows the non-programmer operator to select the destination printer. The print function acquires a new set of parameters (i.e. available formats, film sizes) specific to that printer.

In a preferred embodiment of the present invention, PCW calls the PDS standard Tool palette when composing a new document. The PDS Tool palette has two styles of tools: Image Tools to directly manipulate an image (eg. Window & Level); and Drawing Tools to perform graphics work such as drawing outlines or rectangles. An operator can temporarily hide text, drawing lines, or symbols by clicking on a palette. When the annotation palette is clicked, for example, the text and drawings are removed from the frame. After looking at the unobstructed image, an operator can toggle the palette to show the lines and text again.

In an example of a preferred embodiment of the present invention, communications between PCW and the PDS print routines conforms to the current ACR-NEMA protocol. A PCW window that is fully composed consists of a collection of image, overlay, and format information. This information resides in memory and must be packaged for network transmission.

In an example of a preferred embodiment of the present invention, when the workstation operator issues the Print command for a PCW window, the PCW module builds the necessary structures for network message transmission. Error handling alerts the operator of error conditions during message construction. After the necessary output data structures for network messages are built, PCW submits the information to the communications kernel process for transmission to the target camera. The communications routines build ACR-NEMA messages that instruct the laser camera to generate a formatted film image that represents the original document composed in the PCW window. The communications module also determines error conditions during message construction and transmission and notifies the non-programmer operator via an alert message.

In an alternative example of a preferred embodiment, queries are provided for printer information. In a preferred embodiment, a configuration file is used widely for retaining system configuration information. Therefore, in the preferred embodiment, PCW obtains printer information from the configuration file shared with the PDS modules. Configuration file information includes a list of available printers for the site, specific information for each of the printers, and text template definitions. FIG. 42 illustrates sample templates for two typical modalities.

Hardware Environment for a Preferred Embodiment

Figure 5:
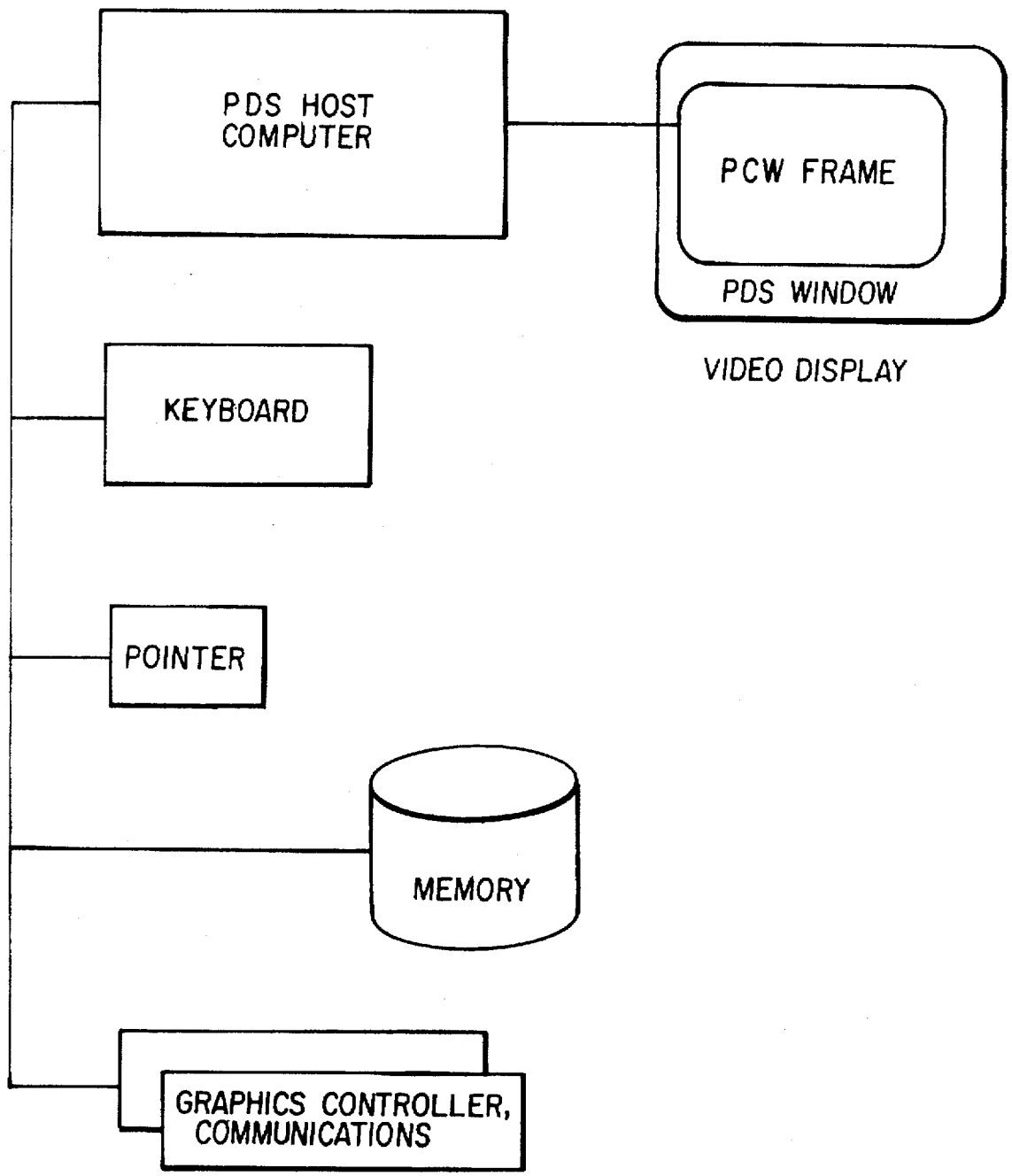
FIG. 5 shows the PCW environment in a block diagram of a video image display system in an example of a preferred embodiment of the present invention.

Referring mow to FIG. 5, a diagram of the hardware environment, for an example of a preferred of the present invention, is depicted. It is useful to describe the hardware, thereby placing the present invention in its operational environment. FIG. 5 is a block diagram of a video image display system incorporating a hardware environment in which one example of a preferred embodiment of the present invention may reside. In the preferred embodiment this hardware environment is typically a Personal Display System (PDS) manufactured by Vortech Data, Incorporated of Richardson, Tex.

The major hardware components of this environment preferably are: a computer (either a Quadra, or Macintosh II fx, or Macintosh II ci), a small computer system interface hard disk drive, a floppy disk drive, a Macintosh NuBus, a serial port, an AppleTalk port, an Ethernet interface card, an imaging processor card, a grayscale video display, a mouse or trackball, and an optional serial card.

The Macintosh II family of workstations acts as the host computer for PDS application programs and the PCW programs. The Macintosh II architecture lends itself to image manipulation and display applications, given its high performance (1.5 to 20 million instructions per second depending on the specific model) and an open design (NuBus).

In one example of a preferred embodiment of the present invention, PCW, the system bus is the NuBus. A high-performance Ethernet controller provides basic connectivity to a medical information network. In an example of a preferred embodiment, the present invention uses a Dome Macintosh imaging display board for each dedicated display in the PDS. It is a 10 Mhz 32-bit Texas Instruments TMS 34020-based specialized image processor. The preferred embodiment supports up to six high-resolution displays. In a preferred embodiment of the PCW, image presentation features include display of diagnostic images inside windows with normal, industry standard operations and image organization as it pertains to the appearance and functions available in each window.

Software Environment for a Preferred Embodiment

The software environment, in one example of a preferred embodiment, is the Macintosh operating system which provides the host environment for software applications running on the Macintosh-based workstations where diagnostic images are viewed and edited. The preferred embodiment includes a local database which provides accessibility and organization of image and report files by the user.

In a preferred embodiment of the present invention, the PCW software exists as an external library that is linked into the PDS system at compile and link time. The access to the PCW menu and functionality requires the setting of a resource flag. The flag is a character string "PCW", which if present, signals the initialization of PCW and the PCW menu at PDS startup time. If the flag is absent, PCW is not initialized and no PCW menu is created. The code is still present within PDS but it is not accessible without the resource flag.

In a preferred embodiment of the present invention, the PCW software comprises a configuration file, header flies, global variables, data structures, and application modules. In a preferred embodiment, operations on window-oriented data conform to specifications for toolbox and palette implementation in *Human Interface Guidelines*. Point and pick operations are accomplished by using a mouse, trackball, lightpen or other user input device or user interface.

In an example of a preferred embodiment of the present invention, the user interacts directly via pointer and keyboard inputs. The method for handling user inputs is via the top level PDS event handler. PDS provides a mechanism which allows a module to define a single function to be called to handle an event instead of being handled by the PDS event handling routines. In a preferred embodiment of the present invention, PCW defines such an event handler routine as the routine named PCW_HandleEvent. A pointer to the current event is passed to this function whereby PCW can process events, such as mouse clicks and keystrokes in ways specific only to PCW operations. PCW_HandleEvent either handles and processes the event or simply returns control to PDS without processing. The return value is interpreted by PDS to determine if it should process the event. If PCW does not process the event, PDS can handle the event properly.

A popular interface is the desktop metaphor implemented on the Macintosh computer, manufactured by Apple Computer, Inc. Many workplace extensions have their roots in this metaphor as well as others intended to implement IBM's OS/2 Presentation Manager or Microsoft's Windows. This widespread popularity seems to be partially attributable to the ease of learning and simplicity of communicating with complex applications which run on these new graphics user interface platforms.

In a preferred embodiment, the primary method of communicating with the user is to present relatively high-resolution graphics on a video display. A non-programmer user communicates with the preferred embodiment, PCW via a keyboard, pointer, light pen or other user input device. These devices are operated to provide text, numbers, symbols, and special functions as input to PCW modules.

Figure 6A:
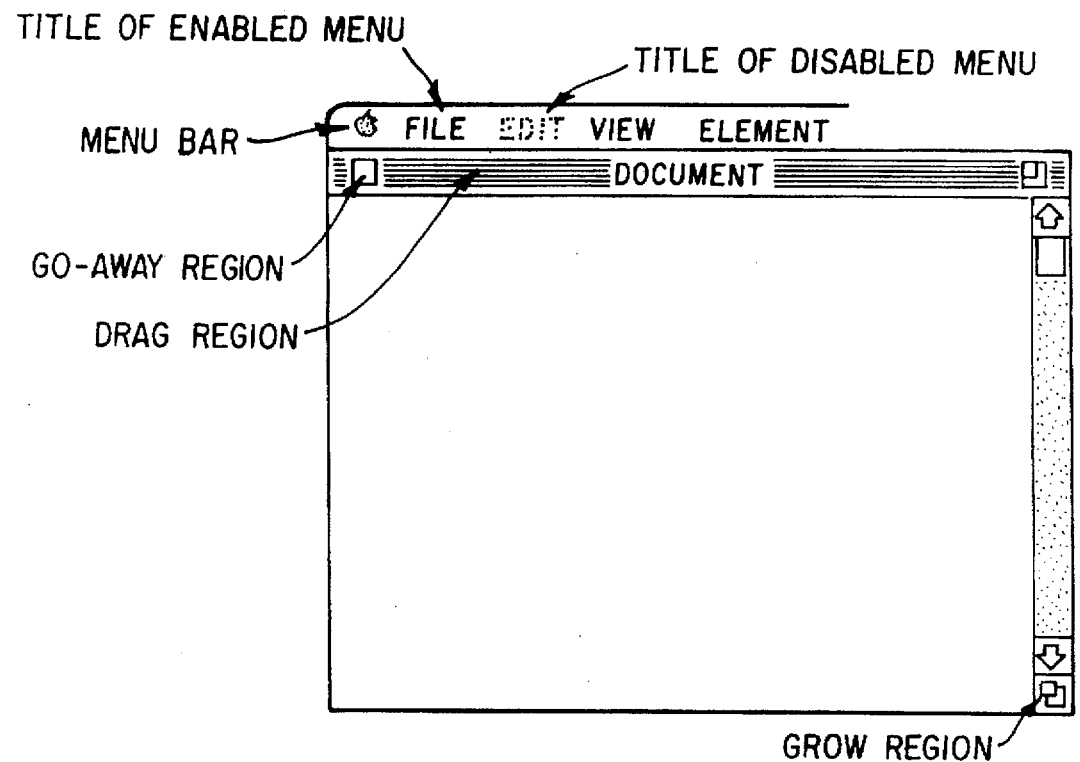
FIGS. 6A and 6B illustrates the components and appearance of the industry standard window in an example of a preferred embodiment of the present invention.
Figure 6B:
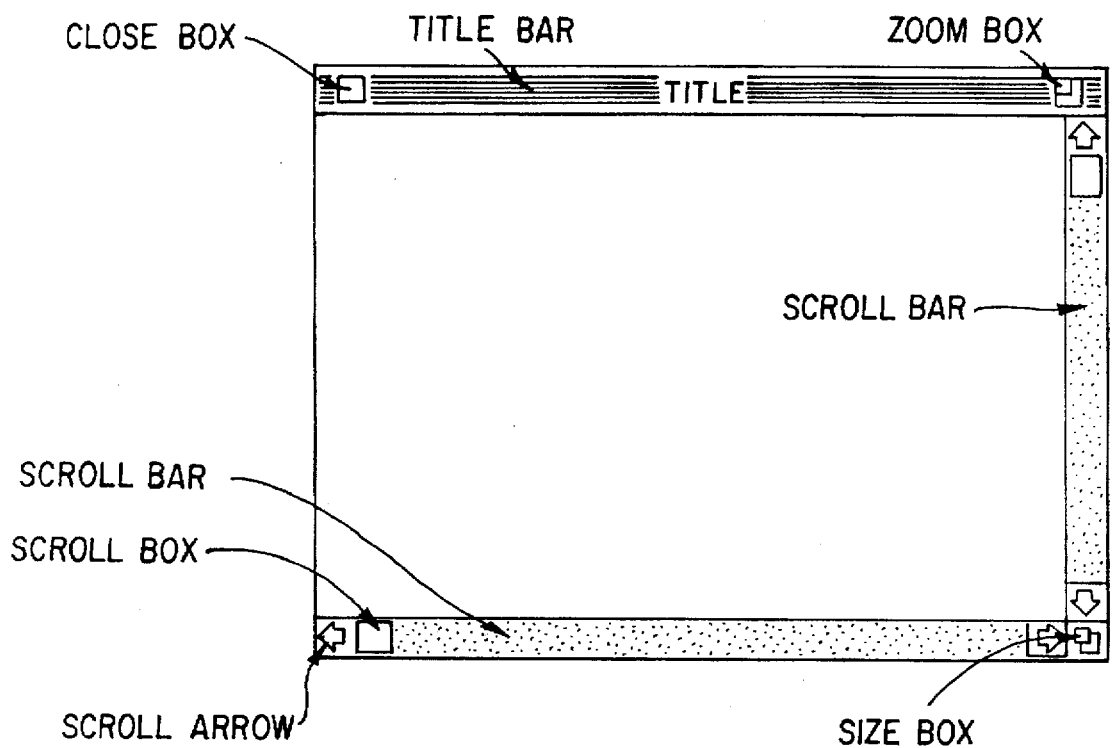
Figure 7:
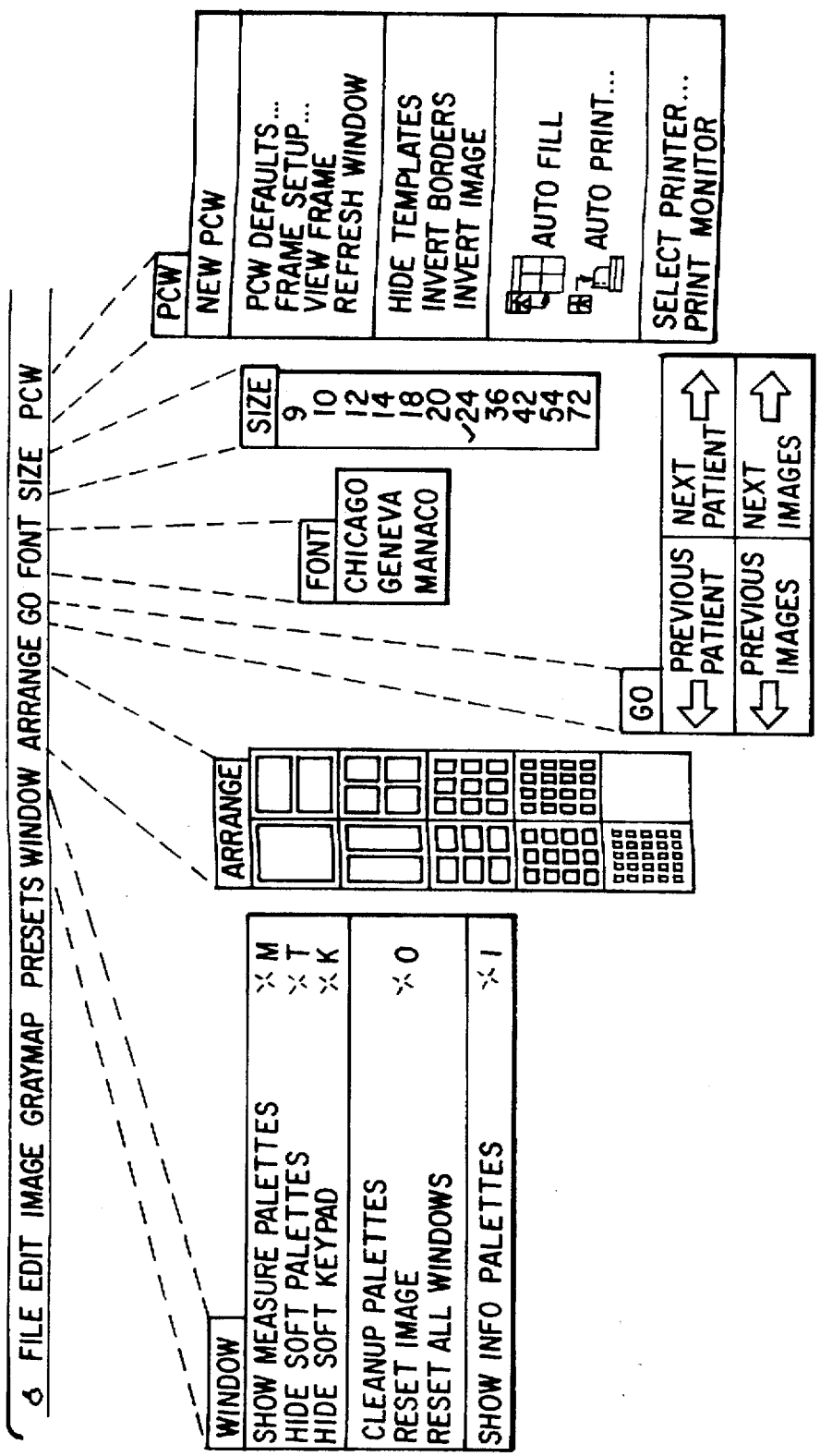
FIG. 7 illustrates the components and appearance of the PDS window in an example of a preferred embodiment of the present invention.
Figure 8:
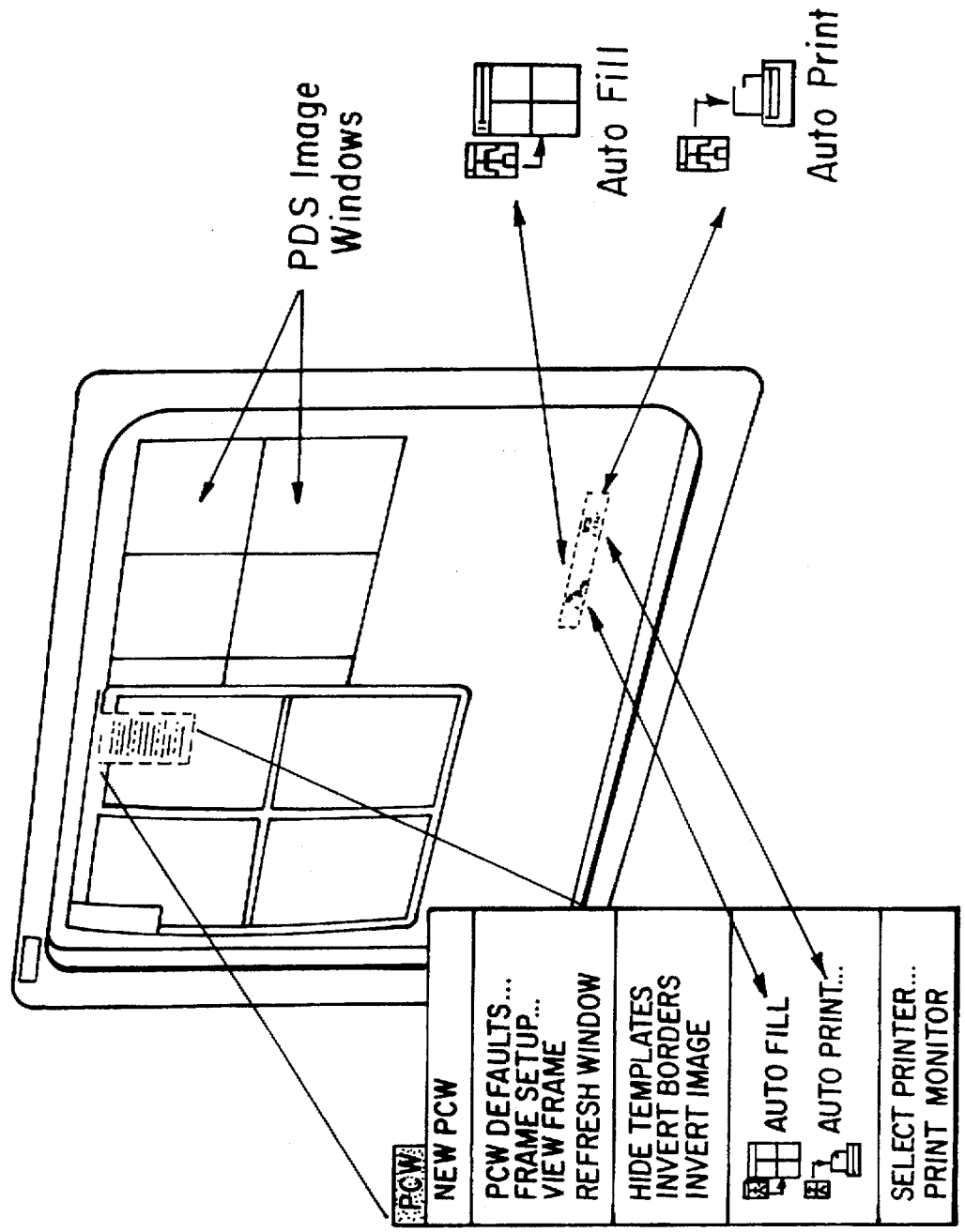
FIG. 8 illustrates the components and appearance of the PCW window in an example of a preferred embodiment of the present invention.
Figure 9A:
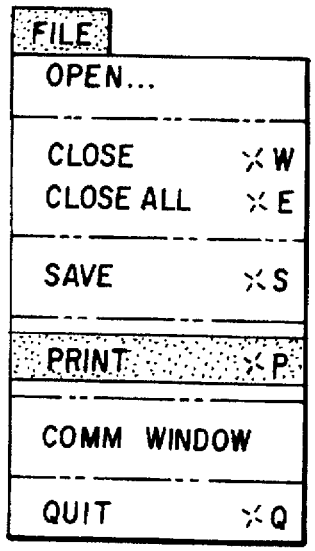
FIGS. 9A–9F illustrates how to open typical dialog boxes in an example of a preferred embodiment of the present invention.
Figure 9B:
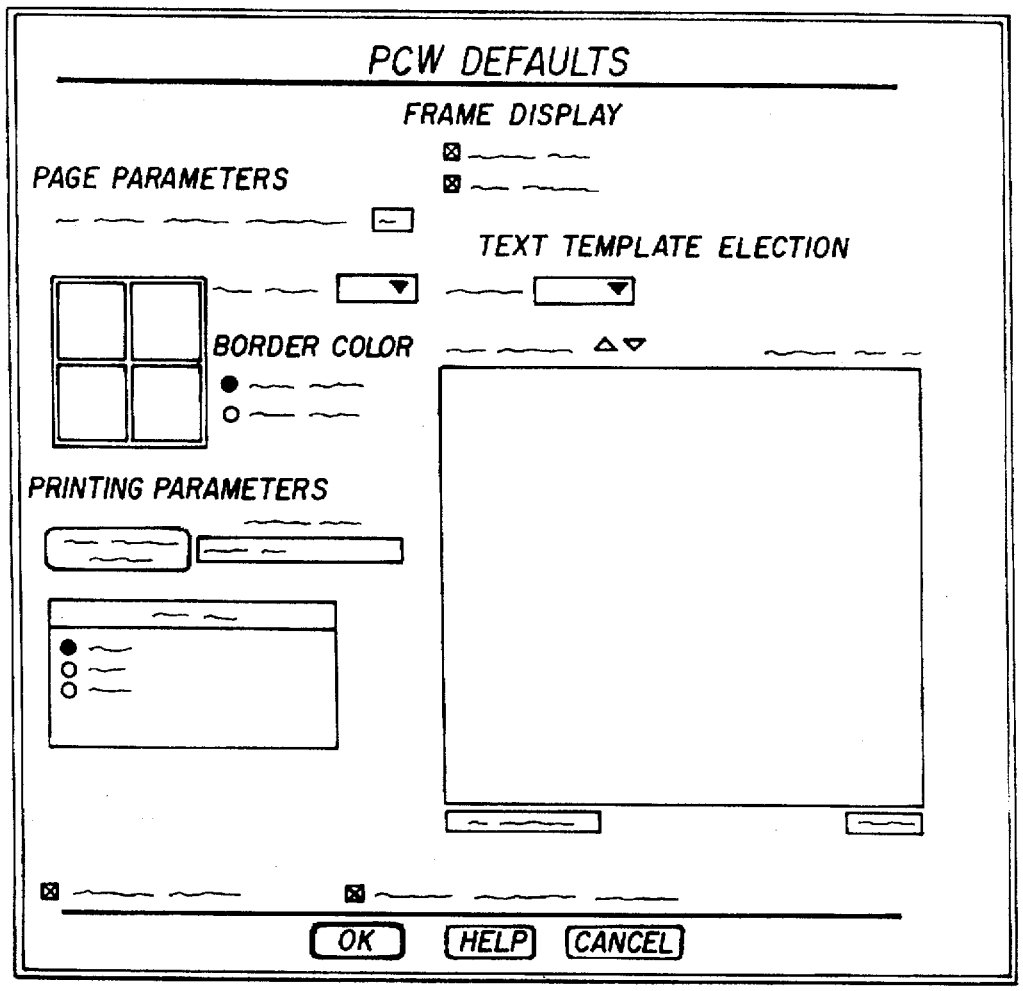
Figure 9C:
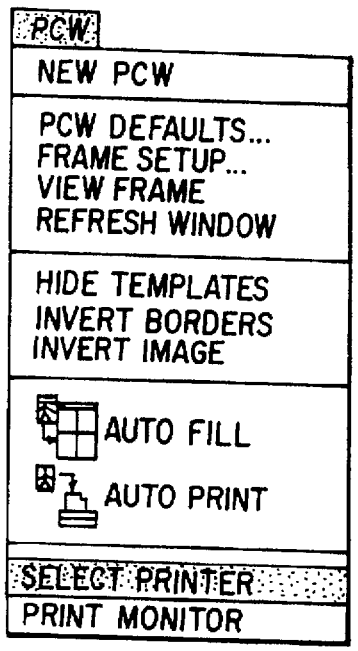
Figure 9D:
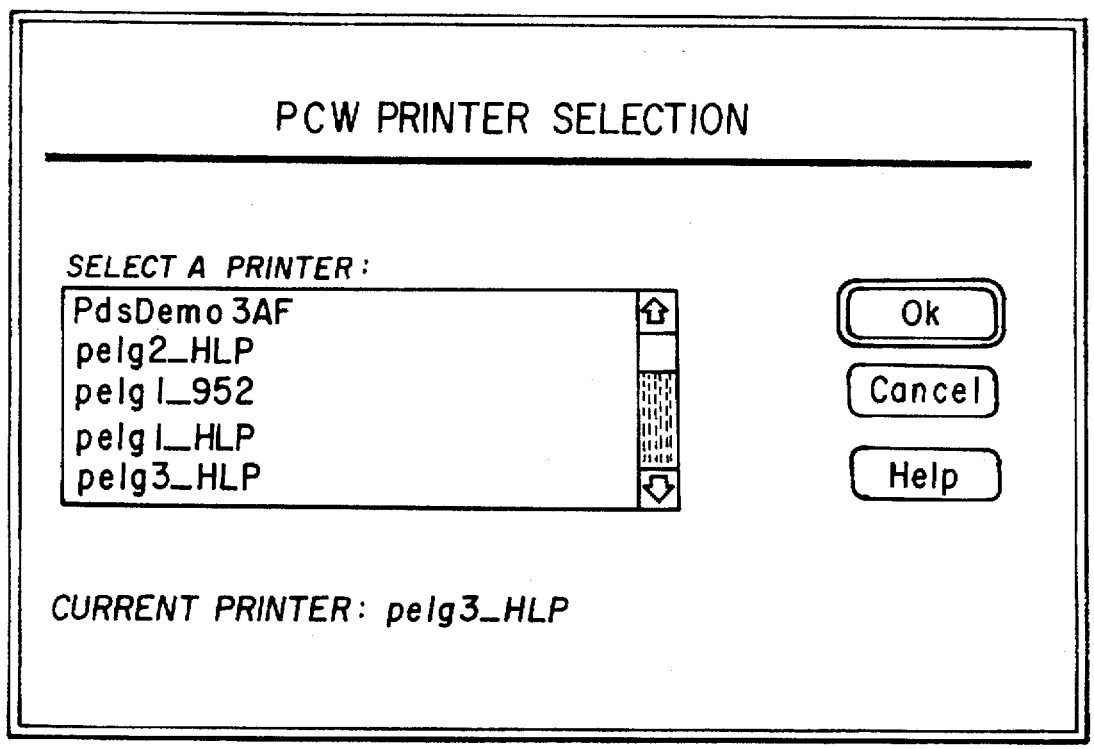
Figure 9E:
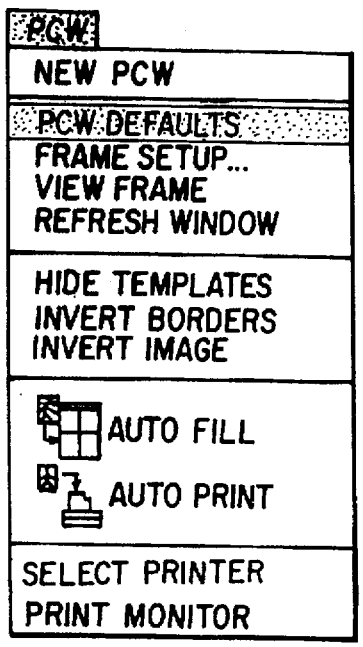
Figure 9F:
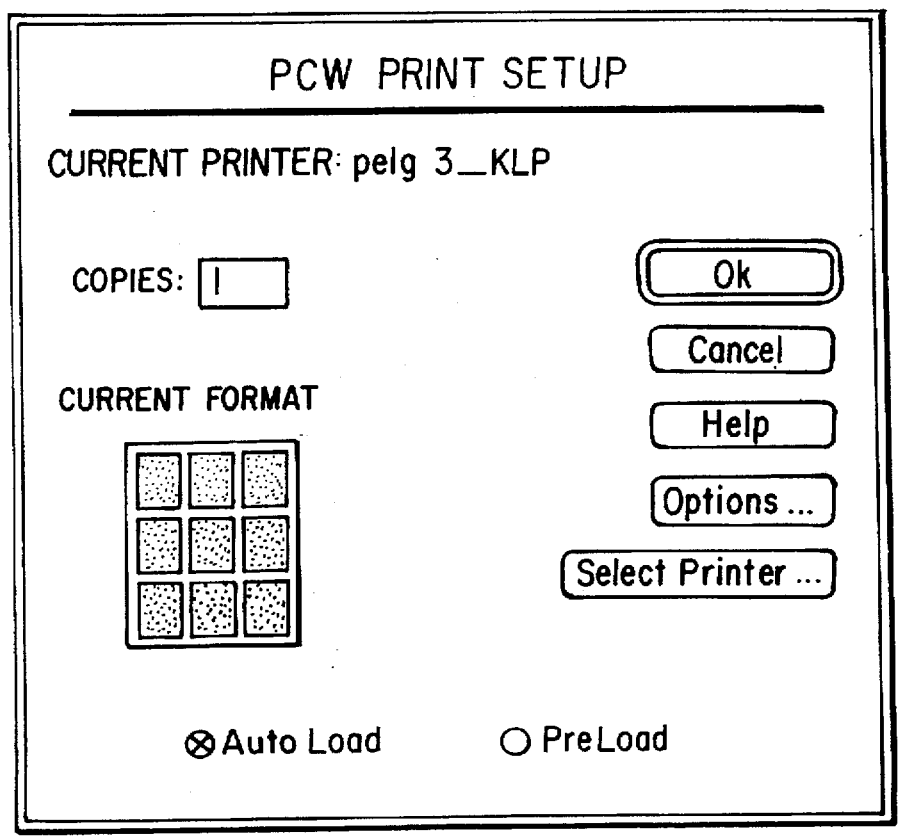

Referring now to FIGS. 6A, 6B, a well know industry standard window is shown. FIGS. 6A, 6B illustrates the components and appearance of a generic industry standard window. FIG. 7 illustrates the components and appearance of a PDS window. FIG. 8 illustrates the components and appearance of a preferred embodiment of the present invention, a PCW window. Windows can be arranged to open in another window. Operator input is solicited within an open window via a special type of window known as a dialog box. A dialog box can be opened or created inside another active window.

Dialog boxes are used in window oriented interactive applications to elicit additional information from the workstation operator whenever some operator action is requested. FIGS. 9A–9F shows, for example, how the PCW Printer Selection dialog box is opened in a preferred embodiment by activating the Select Printer option on the PCW pulldown menu. The illustrated dialog box comprises a rifle, control buttons, a list box, and an indication of the logical name of the selected printer. If the current printer is the target printer, the user can select OK or Cancel. To choose another available, connected printer named in the list box, the user can use the pointer to highlight the name and click on OK. On-line help is available by clicking on Help. After the user finishes supplying additional information or changing control settings, at least one control switch or push button is provided to accept the new condition or to dismiss the dialog box without taking any action.

In an example of a preferred embodiment of the present invention, a central design concept of the present invention is to allow manipulation of graphic objects such as composition frames, medical images, and composed PCW documents directly on the video display screen at the workstation. A pointer enables the operator to point to an object, select the object by clicking a control button on the pointer, move objects between windows, or choose an action to apply to some selected object. The operator has complete control of any task in processing medical images.

Preferably, pointing allows the user to indicate what element on screen is currently relevant to their task, such as grasping a film page, arranging it for comparison with others, discarding, stacking, annotating. While pointing at an object, the user can select the object for action. Until an object is selected, pointing is like flipping, thumbing, or scanning real objects.

Figure 10:
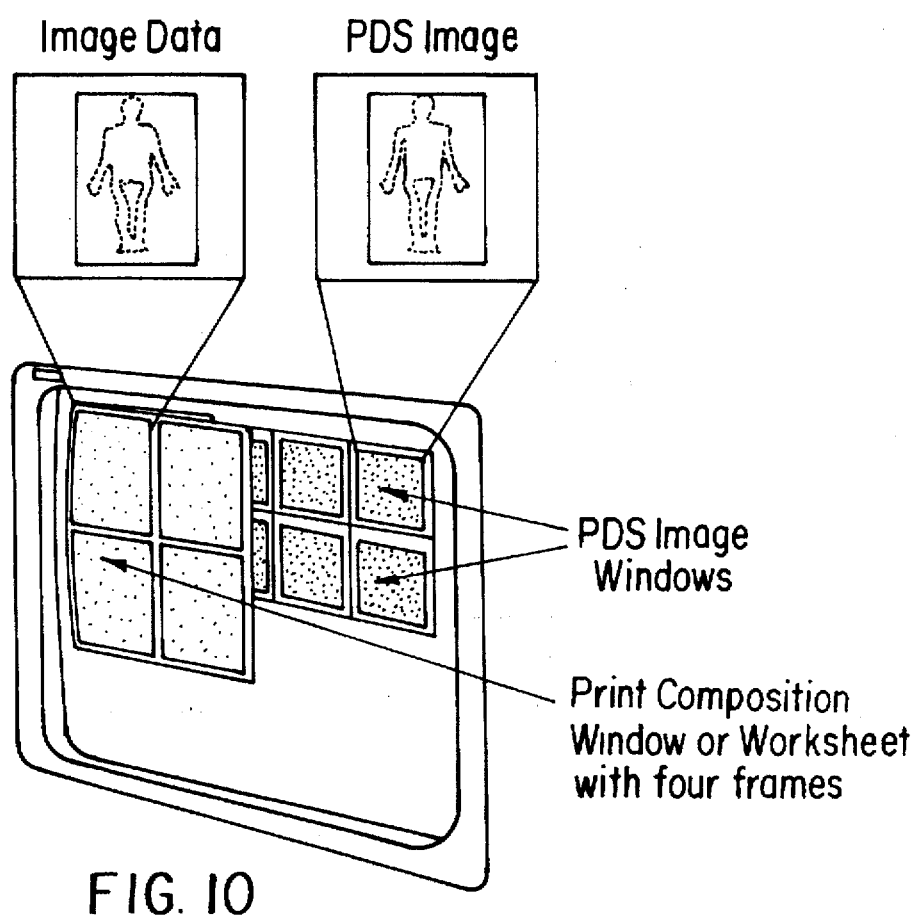
FIG. 10 illustrates a typical PCW window with a medical image displayed in a PCW window composition frame in an example of a preferred embodiment of the present invention.

In a preferred embodiment, upon activation, the present invention opens a PCW window in the PDS monitor. The PCW window is the medium by which the user composes the images, text, and graphic information into a final document. Internally, the window is divided into rectangular sections called frames. Each frame serves as a pseudo window that contains the physical image and graphic drawings, illustrated in FIG. 10.

Preferably, the frames of a PCW window are represented by an array of frame records. Each of the frame records contains information that describes the frame's position within the window as well as the information that is contained within it (such as image data, lines, circles, curves, text, and overlays). In a preferred embodiment, this information is stored within the WindowData structure because PDS drawing and image operations apply to PCW frames as well.

In an example of a preferred embodiment of the present invention, when drawing graphics on an image in the PCW window, the operator must first select and activate a PCW frame by clicking on a frame with the mouse. This action sets a selected flag within the frame's structure. Drawing is performed in an off screen grafport to prevent flickering and then blitted or transferred back into the frame. This offscreen grafport is a frame's annotation layer. This is the annotation bit map associated with the image when sent to a printer and/or storage. The clipping area for the PCW window is defined by the selected drawing frame's boundaries. Clipping prevents image display from running over into adjacent frames and keeps all drawing within a selected frame.

Figure 11A:
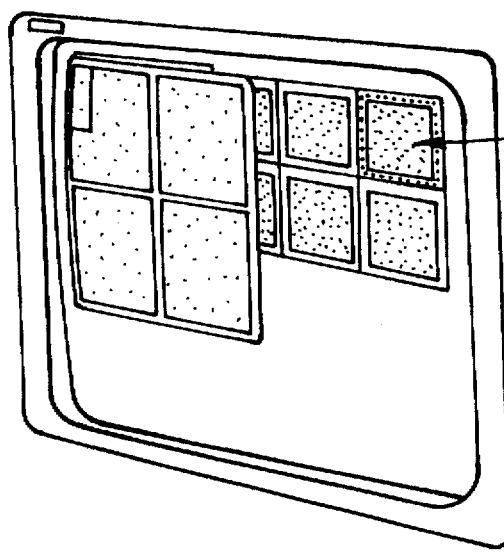
FIGS. 11A–11C illustrates a typical PDS window with queued images in an example of a preferred embodiment of the present invention.
Figure 11B:
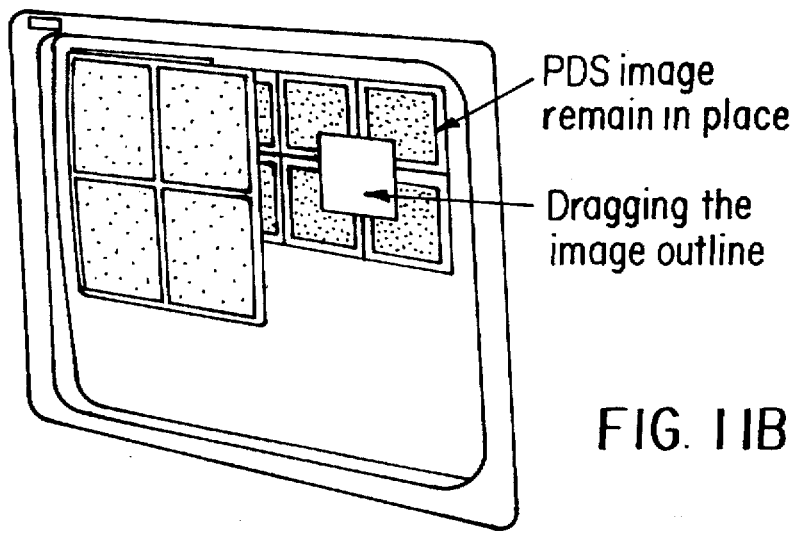
Figure 11C:
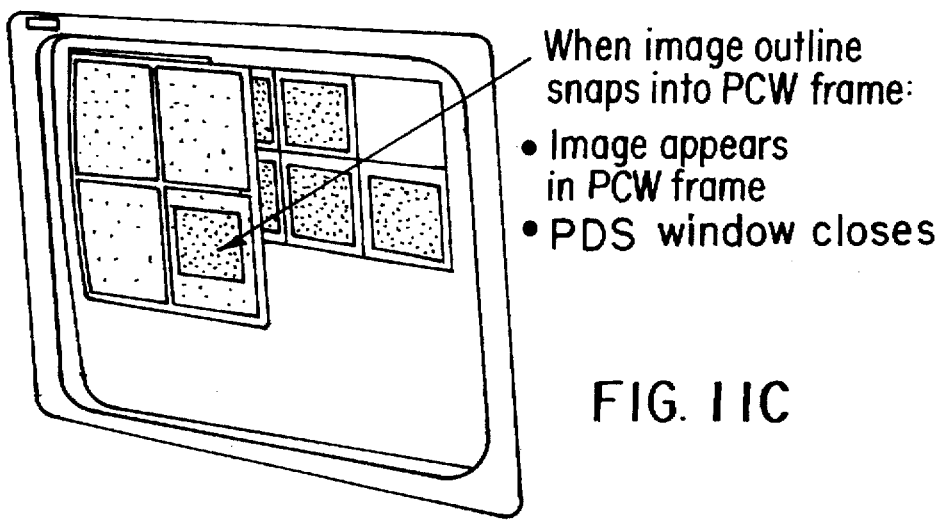

The frame record contains the IIM_IMG_INFO data structure that holds all the pertinent image information for drawing, including patient information. The process of drawing an image into a frame requires transferring the preexisting image information from a PDS window into the selected frame's record. FIG. 11 shows a PDS window containing an image and PCW frames without images before transfer. The PDS window has a pointer to the image information and can display the image accordingly in the selected frame. Image transfer to a frame occurs by assigning the image pointer in the PDS window to the frame's image pointer and setting the PDS pointer to NULL. The image is drawn in the PCW window. FIGS. 12A, 12B shows how the PDS and PCW windows appear on the workstation before and after transfer.

Overlays

Figure 13:
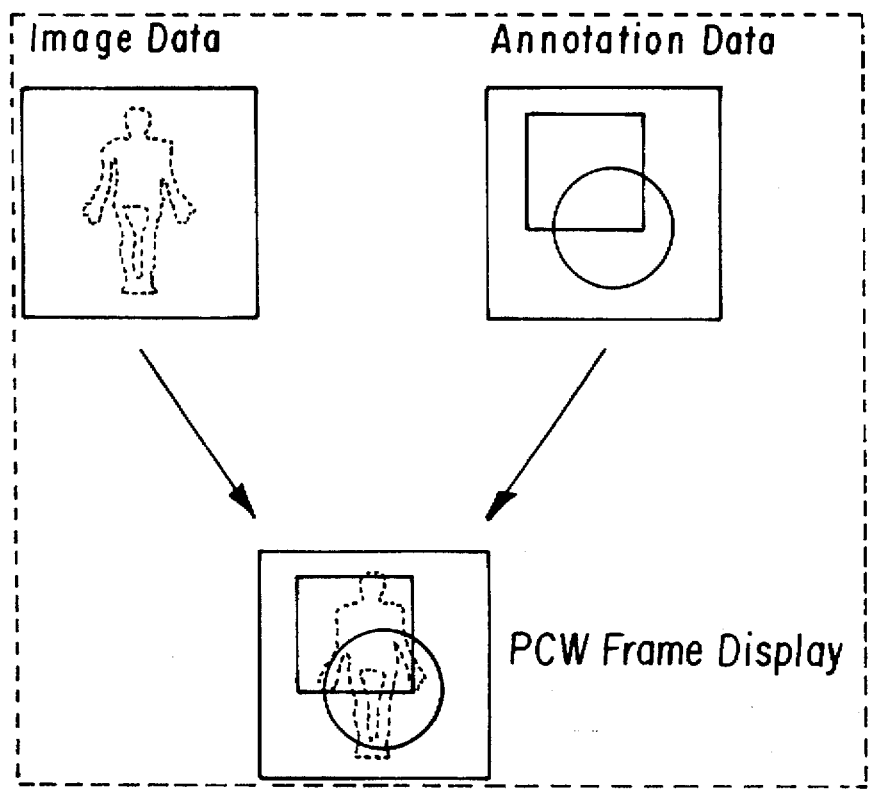
FIG. 13 illustrates how the PCW frame display is made from annotation data and image data in an example of a preferred embodiment of the present invention.

In an example of a preferred embodiment of the present invention, overlay information is represented as a bit map separate from the actual medical image data. The overlay bit map is derived from the annotation information created using the PDS drawing tools. During the PCW composition, the two bit maps (image, annotation) are brought together and displayed in the selected frame. FIG. 13 shows how the two bit maps exist separately and are combined in the display. Printing and/or storing the PCW document requires supplying pointers to the overlay information bit map and image data bit map or the bit maps themselves.

In a preferred embodiment, PDS provides the services to attach overlays in either of two ways, as a separate bit map, and imbedded into the image data. In the first case, the overlay data is defined as a separate bit map. The information is encoded as such in the ACR-NEMA printing messages and sent to the selected output device. In the second case, whenever possible, the overlay information is masked into the actual image data. This process requires direct pixel value manipulation so that the overlay image is stored in the image. The decision of which representation to use is based on the availability of free pixels in the image data. The imbedded overlay is used when there are unused pixels in the pixel data word. For example, if 16 bits are allocated for a single pixel, and the number of bits used to define the pixel value is 12, the upper-4 bits would be available for imbedding overlay information.

Figure 14:
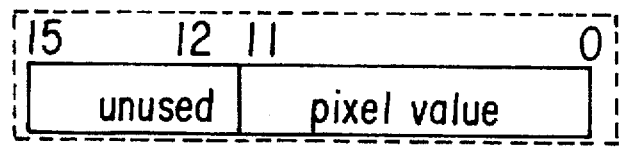
FIG. 14 illustrates an example setting of an overlay pixel word in an example of a preferred embodiment of the present invention.

In a preferred embodiment, the masking procedure sets the first available bit in the upper-4 bits of each pixel word of the image to indicate overlay information. Thus, a pixel containing an overlay with bit-12 available for overlay data would look like the pixel word in FIG. 14. The overlay bit is set or reset depending on the value of the overlay (presence of an overlay at that pixel). This data compression and optimization technique prevents unnecessary transmission of overlay data in a separate bit map. Otherwise the print spooler would be required to allocate memory for a second bit map.

Scout Lines, Patient Orientation

In an example of a preferred embodiment of the present invention, scout lines indicate the intersection of a displayed image with another image. Scout lines and patient orientation values are displayed by means of existing PDS routines. The image data and rectangular drawing area within the frame are the only parameters needed by the display routines to correctly display the scouts and orientation in a PCW frame. The selection of scouts to be displayed is provided on the scouts. Image orientation values are displayed if they are provided in the image header.

Figure 15:
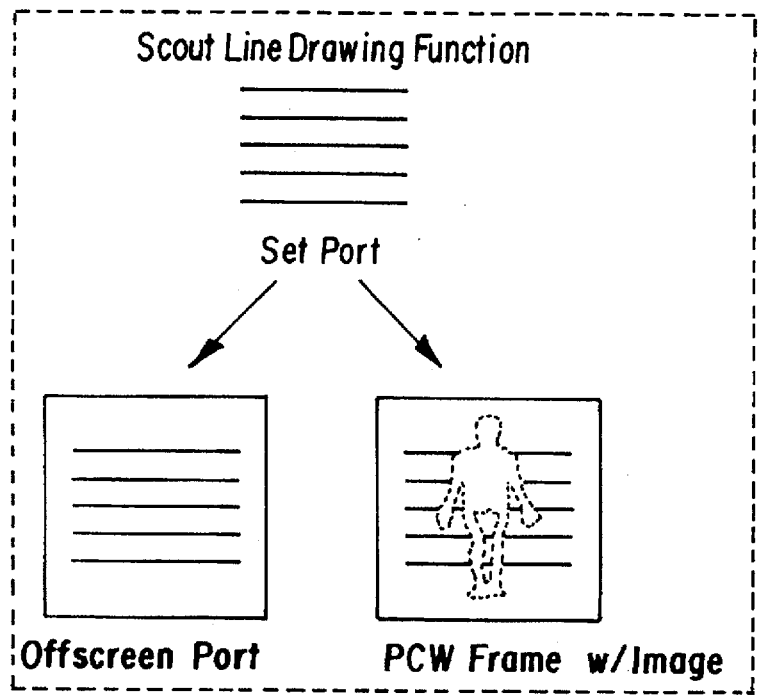
FIG. 15 illustrates redirection of drawing into different ports in an example of a preferred embodiment of the present invention.

Preferably, the printing of the patient orientation values is handled by the printer interface. If the patient orientation values are present in the ACR-NEMA image header, then they will be printed. Printing scout lines requires creating a separate overlay bit map. During the composition process, the scouts and orientation values are simply displayed in the PCW frames. The overlay creation occurs at the time of printing. At this time, if the PCW scouts overlay does not yet exist and the image to be printed has scouts displayed, then a new offscreen bit map for the image is allocated for offscreen drawing. The rectangular dimensions for the offscreen bit map are defined to be the same dimensions as the image being drawn for. When a frame's image is sent for printing, the drawing port is set to the offscreen port and the drawing routines are recalled to draw the scout lines. FIG. 15 illustrates the simple redirection of drawing into different ports.

Figure 16:
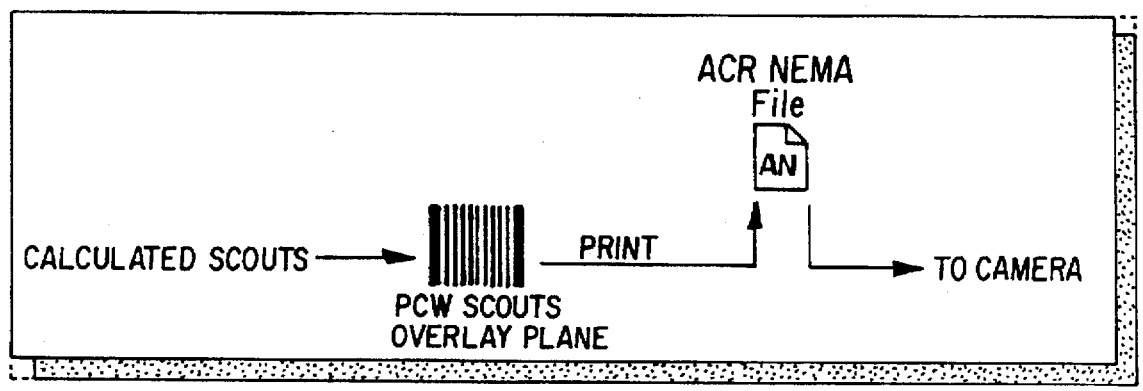
FIG. 16 illustrates data flow during printing in an example of a preferred embodiment of the present invention.

In a preferred embodiment, a single offscreen bit map provides the scouts overlay for each image in a PCW frame. As each frame is processed for printing, the scout lines are drawn into the off screen port. The offscreen bit map is written to a file on disk where the ACR-NEMA routines access it to create an overlay group for that image. The flow of data during printing is illustrated in FIG. 16. During Auto Print mode of operation, the process is similar to the process as described above, however, there is no PCW window. PDS images are displayed and printed individually. Each image displaying scouts has a scout overlay generated for it and is sent to be printed.

Text Templates

In an example of a preferred embodiment of the present invention, in order to facilitate the simultaneous presentation of patient demographics and modality information along with the related medical image, in the preferred embodiment, PCW uses a mechanism called a text template. A text template is like the labels in a data input form. Labels are character strings that spell out the names, patient demographics and modality information. In the preferred embodiment, customized text templates are implemented as data structures in a configuration file. This file provides the means to display and compose text information in PCW frames along with a medical image and its annotations and drawings. The text template structures define the format and contents of data fields. Each template can hold labels and values of attributes of the institution, patient, modality, and the medical image as well as comments. Each template also contains indications of where to place and how much padding or space to leave blank around the image in a frame and where to place text. FIG. 17 shows an example of text templates for two modalities.

Figure 18:
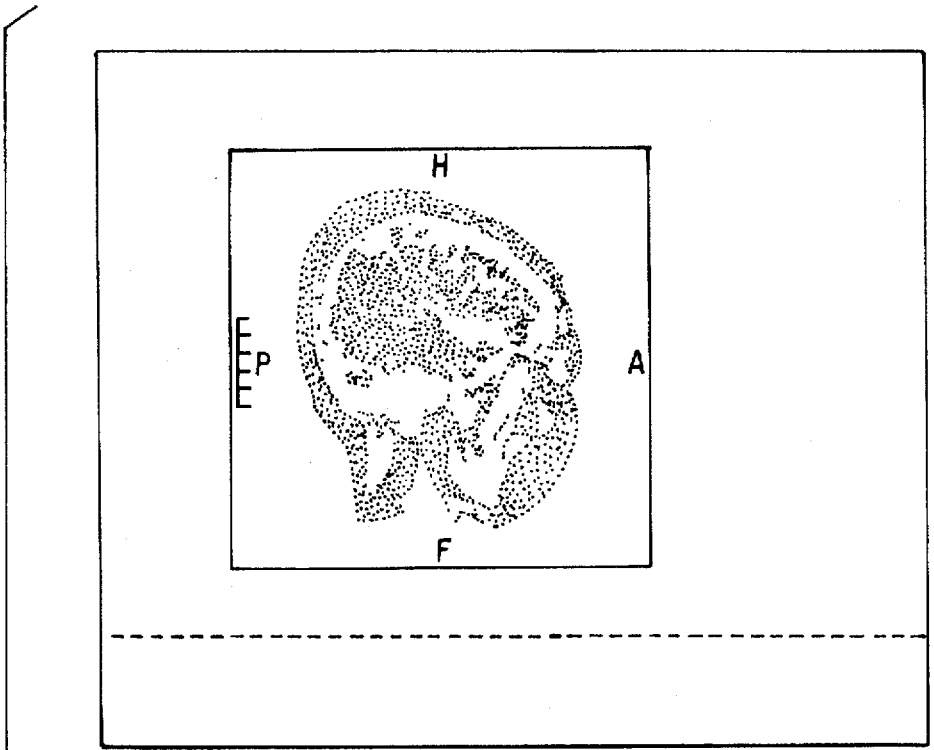
FIG. 18 illustrates a sample template with labels in an example of a preferred embodiment of the present invention.

FIG. 18 shows a sample template with labels such as: Study Date, Patient Name, and Patient ID. A set of such templates may be predefined according to user preference. Then, at composition time, the user can select an appropriate template for the current medical image.

Preferably, templates, such as the sample illustrated in FIG. 19A, are made up of five kinds of data statements: FORM_DEF (indicates modality information), PADDING (indicates padding for text display), PRINTER_FONT (indicates desired display font), TEXT_STRING (indicates text labels and text strings to print or display), and COMMENT_# (for readability, notes, maintenance, or other non-printing text).

Figure 20:
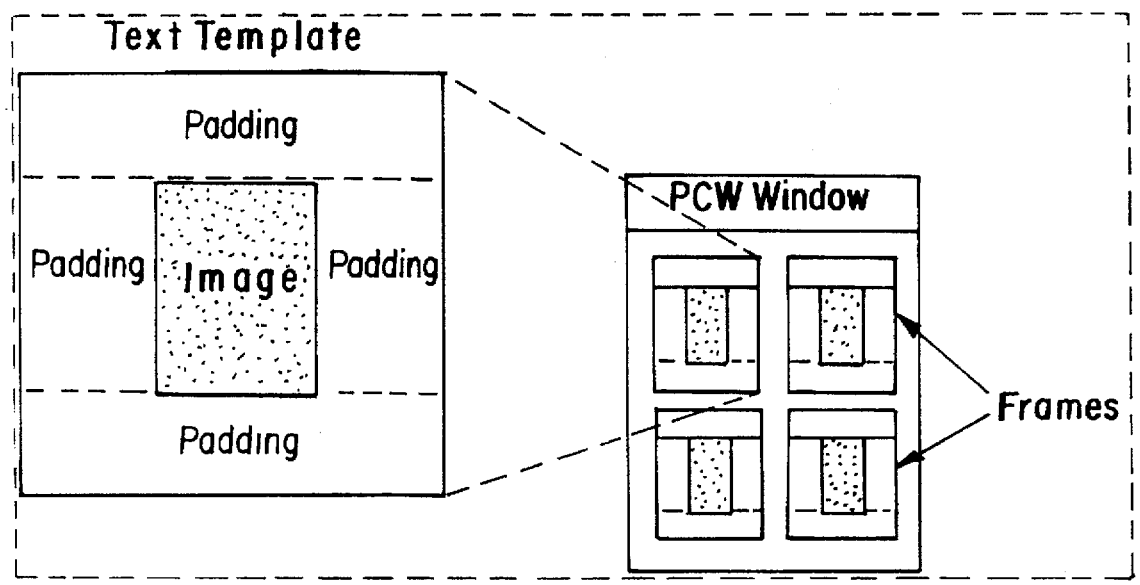
FIG. 20 illustrates the orientation of text template pixel padding in an example of a preferred embodiment of the present invention.

FIG. 19B shows an example of a FORM_DEF statement in preferred embodiment. FIG. 19C shows an example of a PADDING statement. FIG. 19D shows an example of a PRINTER_FONT statement. FIG. 19E shows an example of a TEXT_STRING statement. Detailed instructions and examples are provided in *Text Templates, Guide to ACR-NEMA 6800 Group Template Editing*, published by Vortech Data, Inc., which is hereby incorporated by reference. ACR-NEMA protocols for message groups permit a user to specify the amount of padding pixel areas on and around the image that defines a total pixel matrix. It is within this pixel matrix that text may be drawn. FIG. 20 illustrates the orientation of text template pixel padding and the image matrix within a PCW frame.

Preferably, the text templates are stored in a local configuration file. The template definitions are read in and stored into a global array when the PCW is initiated. The templates can then be referenced by an ID number which equates to the array index in which they are stored. The global storage of templates makes them accessible to all the routines that require template definitions. For example, when a frame is assigned a template identification number or ID, the drawing murine for an individual frame may retrieve the necessary information from the template array instead of each frame having to each store its own template information.

Figure 21:
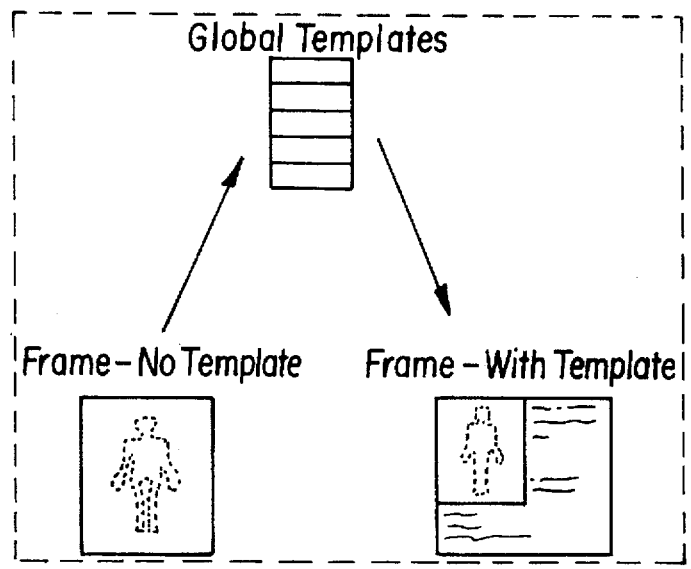
FIG. 21 illustrates the layer concepts of images and templates in an example of a preferred embodiment of the present invention.

The layers presentation concept of images and templates is illustrated in FIG. 21. At the same time that the text templates are read from the configuration file and stored into memory, each template read is also formatted and shall also be formatted and written to disk as an ACR-NEMA formatted file. In a preferred embodiment, the template elements are collected and translated into an ACR-NEMA message which is then passed to the ACR-NEMA file library system to be written. The following algorithm describes the process by which templates are read into memory and written to disk:

Open "config" file

PreRead templates to record count

Allocate memory for templates for each template in "config"

(Add template info to global array index element Increment index)

For each template read (Build ACR-NEMA message containing template info
Construct pathname for file Open file in template directory WRITE message to template directory)

The template directory is derived by concatenating the base directory where the selected Doctor Preferences file exists and the string defined by the global constant TEMPLATEPATH. The full pathname of the file is then constructed by appending the string defined by the global constant TEMPLATEFILE plus the id of the template being written. For example, the full pathname for template with an id of 5 and a preference file from the <HD> Dr. Bob: directory would be "<HD> Dr. Bob:<TEMPLATEPATH>:<TEMPLATEFILE>.id"

In an example of a preferred embodiment of the present invention, the benefit of writing text templates to disk is that at the time of printing a PCW frame containing an image and a text template, instead of building the ACR-NEMA elements for the text template manually and then merging it into the final message, a simple READ from the template file returns the template already in ACR-NEMA message format and can simply be merged into the final message. This implementation significantly reduces the processing time of printing images with text templates.

In an example of a preferred embodiment of the present invention, the templates provide a simple ACR-NEMA approach to text placement on printed films. In another example of a preferred embodiment, PCW incorporates free formatting, user definable templates, or downloadable templates from an existing database as the capabilities for more sophisticated careens evolve.

Preferably, patient demographic information is related specifically to each medical image of each particular patient. It includes data such as patient name, study date, number of the image in a series of images, and other information about the patient or current medical situation. Medality information concerns attributes of the source modality that produced the medical image, and other physical or technical attributes of the image. Patient and modality information are displayed in the text template layout, layered or superimposed over the medical image as shown in FIG. 21.

Patient demographic information coexists with each image in the medical image database and often it is desired, or sometimes required, to be printed along with the medical image. Text templates can be customized for an installation site, according to the user's preference. When a medical image is retrieved, the values of the variables are transferred into the user selected text template layout. The text templates are defined in the configuration file to display the kinds of pertinent patient or modality information in a way that will provide the best diagnostic presentation, in the current medical situation.

Figure 22:
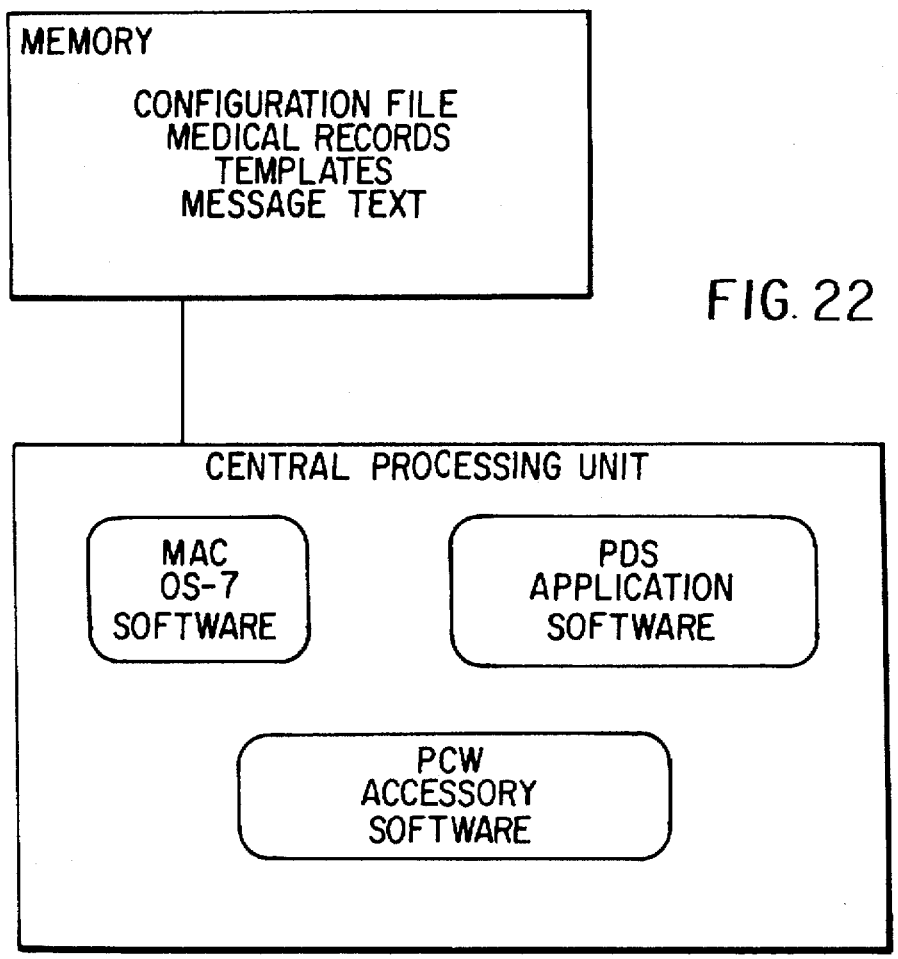
FIG. 22 is a pictorial representation of relationships among PCW processing modules, information, and the operating system in an example of a preferred embodiment of the present invention.
Figure 23:
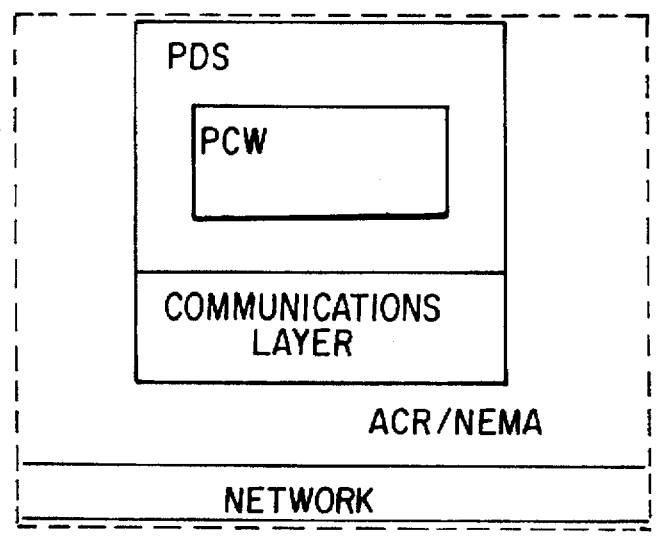
FIG. 23 illustrates PCW communication concepts in an example of a preferred embodiment of the present invention.

FIG. 22 shows the conceptual relationships among PCW processing modules, PCW message structures, and PDS modules. FIG. 23 illustrates the PCW COMMUNICA- TIONS concepts in a preferred embodiment. This system configuration allows the PVW to share all PDS functions and data and to directly access the PDS communications routines. Direct access is necessary to transmit formatted information in composed PCW frames to remote printers or to the archive system.

In an example of a preferred embodiment of the present invention, composed frames in a PCW window contain all the information necessary for remote printing or archiving. All the individual components (ie. images, overlays) are collected and formatted into structures which can be interpreted and handled by the communications routines where they are converted to ACR-NEMA messages. The four kinds of ACR_NEMA messages are generated by software functions in the COMMUNICATIONS module.

For example, consider printing a document consisting of a PCW window that contains composed frames. Each frame contains a medical image with an overlay and a text template. The frame record contains a pointer to the image record which contains all the information associated with a patient's medical image, including the actual image data, window & level values, overlays, annotations, and scouts.

In a preferred embodiment, the process of sending a PCW document to a printer or storage device involves the following steps: accessing information for each individual composed frame, calling the PDS formatting routines, and generating the print message set. The process of generating a print message set for a PCW window in the preferred embodiment requires loading information into a base message structure. Then other formatting elements are loaded into the message structure. The print routines may then be activated to print the page. In the preferred embodiment, the PUT macro converts PCW information into a ACR-NEMA format.

Preferably, the print routines preferably operate on different information to start, continue, or stop. Thus, in a preferred embodiment, there are four different message types implemented for speed and economy in storage. The INIT message is used for initialization. The IMAGE message is used for sending multiple images. The TERMINAL message tells the print spooler to dump the accumulated images of the message set. The COMPLETE message is used to print one frame.

The COMM functions construct an example AN_PUT_ELE array with a limited set of field values contained in the <*parms> parameter. The fields used are those required only once per message set. The put element array is then sent to the PDS communication functions which creates a message containing these elements.

In a preferred embodiment, the INIT message provides setup information to the print spooler such as number of images per page, message set id, and other information relating to the entire collection of messages for the PCW document. An example of the preferable construction of the INIT message follows:

```
static AN_PUT_ELE pe[ ] =
{AN_PUT_STRING(ANO_MSG_SET_ID,msg_set_id,0),
 AN_PUT_BI(ANO_PS_TTL_IMG,imageCount,0),
 AN_PUT_SHORT(ANO_PG_POS_ID,pg_pos,0),
 AN_PUT_BI(ANO_PS_TTL_PAGES,ttl_pages,0),
 AN_PUT_STRING(ANO_NOR_RES,inv,0),
 AN_PUT_SHORT(ANO_DSP_FMT, format,0),
```

-continued

```
 AN_PUT_STRING(ANO_BORDERS,bds,0),
 AN_PUT_SHORT(ANO_COPIES,copies,0)}
```

After the information is loaded into the INIT structure, a preferred embodiment of the present invention calls the PCW routine which submits the accumulated information to the PCW routine that generates an ACR-NEMA message, PCW_SubmitCommInfo(pe, pn_cnt, params-> templateID,params-> image,params).

There must be one message created for each composed frame to be printed. Preferably, the following structure and message is generated for each frame:

```
static AN_PUT_ELE pe[ ] =
{AN_PUT_STRING(ANO_MSG_SET_ID,msg_set_id,0),
 AN_PUT_BI(ANO_PS_TTL_IMG,imageCount,0),
 AN_PUT_BI(ANO_PS_TTL_PAGES,ttl_pages,0),
 AN_PUT_SHORT(ANO_PG_POS_ID,pg_pos,0),
 AN_PUT_STRING(ANO_NOR_RES,inv,0)}
```

And after the IMAGE structure is loaded, the preferred embodiment calls the PCW routine to submit the message PCW_SubmitCommInfo(pe, pn_cnt, params-> templateID,params-> image,params).

The TERMINAL structure is used to send the last image and to tell the print spooler to print all the images. In a preferred embodiment, the print spooler has been collecting the frame information and grouping it together according to the message set id. The terminal message is the final message that gives the print spooler the final command to either PRINT or ERASE. A example of the preferred structure and message follows:

```
static AN_PUT_ELE pe[ ] =
{AN_PUT_STRING(ANO_MSG_SET_ID,msg_set_id,0),
 AN_PUT_BI(ANO_PS_TTL_IMG,imageCount,0),
 AN_PUT_SHORT(ANO_PG_POS_ID,pg_pos,0),
 AN_PUT_BI(ANO_PS_TTL_PAGES,ttl_pages,0),
 AN_PUT_STRING(ANO_NOR_RES,inv,0),
 AN_PUT_STRING(ANO_PRINT,print,0)}
```

After loading the TERMINAL structure, the PCW routine is called to submit the message PCW_SubmitCommInfo (pe, pn_cnt, params-> templateID,params-> image, params). In cases where there is only a single frame printed, one message can be constructed. The information is basically an accumulation of the elements already described:

```
static AN_PUT_ELE pe[ ] =
{
 AN_PUT_STRING(ANO_MSG_SET_ID,msg_set_id,0),
 AN_PUT_BI(ANO_PS_PAGE_NUM,page,0),
 AN_PUT_BI(ANO_PS_TTL_PAGES,ttl_pages,0),
 AN_PUT_BI(ANO_PS_TTL_IMG,imageCount,0),
 AN_PUT_SHORT(ANO_PG_POS_ID,pg_pos,0),
 AN_PUT_STRING(ANO_NOR_RES,inv,0),
 AN_PUT_SHORT(ANO_DSP_FMT, format,0),
 AN_PUT_STRING(ANO_BORDERS,bds,0),
```

-continued

```
    AN_PUT_SHORT(ANO_COPIES,copies,0),
    AN_PUT_STRING(ANO_PRINT,print,0)
}
```

And after the COMPLETE structure is loaded, the PDS routine submits the message, PCW_SubmitCommInfo(pe, pn_cnt, params-> templateID,params-> image,params).

In a preferred embodiment, global variables are used by PCW and other modules. For example:

```
int     gPCW_rvideo
int     gPCW_borders
int     gPCW_templateCount
float   gPCW_hw_ratio
short   gPCW_FormatsAvail
short   gPCW_copies
int     gPCW_FormatIndex
char    gPCW_TmpltCfgFile[64]
short   gPCW_TemplatesOn
short   gPCW_CommEnable
char    gPCW_MsgSetID[80]
char    gPCW_SrcNetName[80]
char    gPCW_ReqNetName[80]
short   gPCW_SuppressWarnings
short   gPCW_UseTextOffset
long    gPCW_MaxCopies
int     gPCW_TmpltID_CT
int     gPCW_TmpltID_MR
int     gPCW_TmpltID_DR
int     gPCW_TmpltID_DS
int     gPCW_TmpltID_NM
int     gPCW_TmpltID_OT
int     gPCW_TmpltID_US
int     gPCW_TmpltID_FD
int     gPCW_TmpltID_CR
int     gPCW_TmpltID_XR
short   gPCW_ArrangeColumns
short   gPCW_WindowPct
```

Data Structures

In a preferred embodiment, data structures are defined as shown in the following examples. PCW data is arranged as a hierarchical structure with a window record being the parent structure and frame records as children. An example of the preferred structure for the window record follows. The window record associates the window's grafport for drawing the composed frames in a PCW window.

```
#define MAX_FRAMES          25  /* Maximum allowed frames per window */
#define PCW_MAX_TEMPLATES    5  /* Maximum templates definable */
#define PCW_TXT_TEMPLATES   50  /* Maximum number of text templates allowed */
#define PCW_MAXTEXT         30  /* Maximum number of text items for a template. */
```

The TEXT TEMPLATE structure specifies parameters that define the template pixel matrix and text strings to be printed for an image.

```
typedef struct TXT_TEMPLATE
{
    char            cam_type[TXT_CAMTYPELEN].
                    modality[TXT_MODALITYLEN],
                    manu[TXT_MANUFLEN];
    short           id,
                    total,          /* Total number of text items */
                    font,
                    fontsize,
                    rel_rule,       /* Relative Rule */
                    units,          /* Default Units of measure */
                    threshold;
    char            truncate[1];
    short           origin,
                    l_pad,          /* Left padding */
                    t_pad,          /* Top padding */
                    r_pad,          /* Right padding */
                    b_pad;          /* Bottom padding */
    TPLTTEXT        text[PCW_MAXTEXT];
}TXT_TEMPLATE, *TXT_TMPLATEPTR;
```

The TPLTTEXT structure specifies parameters for each text string to be printed in the text template:

```
typedef struct TPLTTEXT
{
    int offset;                             /* Offset value for relative positioning. */
    short       id,
                font,                       /* Override for default */
                fontsize,                   /* Override for default */
                units,                      /* Units of measure: Pixel or Character */
                presentation;
    char        row[TXT_ROWLEN],            /* Vertical coordinate of text string */
                column[TXT_COLLEN],         /* Horizontal coordinate of text string */
                AN_obj[TXT_ANOBJLEN],       /* Group,Element number of ACR/NEMA object */
                label[15],
                format[TXT_FMTLENGTH],      /* Printf format */
                def_value[TXT_DEFLTVALLEN]; /* Default value to use if no entry */
}TPLTTEXT;
```

The FRAME_RECORD structure specifies all the information necessary to replicate the information into the ACR-NEMA messages that will be sent to the print spooler for printing.

```
    typedef struct FrameRecord
    {
WindowPtr       parent;         /* Used for Print composition */
MyGWorldPtr     theWorld;       /* the main world */
Rect            dRect;          /* destination rectangle for image */
Rect            padRect;        /* Rectangle for template padding */
Rect            bounds;         /* Rectangle coordinates in a PCW's local coordinates. */
int             templateID;     /* Format id for frame construction. */
Boolean         selected;
IIM_IMG_INFO    *image_info;    /* Pointer to image record */
long            invert;
short           page_pos;       /* Location in window. Same as array index + 1. */
    }FrameRecord;
```

The FrameInfo structure specifies the FrameRecord array for all of the composed frames in the current PCW window.

```
typedef Struct FrameInfo
    {
int         frameCount;
short       rows;
short       columns;
FrameRecord frames[PCW_MAXFRAMES];
long        borderColor;        /* Black or white; default: black */
long        def_fr_invert;      /* Default frame inversion */
Boolean     dirty;              /* if dirty then it needs to be saved */
Rect        WorkBounds;         /* Rectangle containing all frames */
Boolean     Auto;               /* Is this an Auto Print window */
Boolean     Overlays_on;        /* Display overlays flag */
short       outline_on;         /* Text template outline flag */
    }FrameInfo;
```

There is one modification to an existing structure definition in PDS:

```
typedef struct WindowData
{
    short       type;        /* the window type */
    MyGWorldPtr theWorld;    /* the main world */
    MyGWorldPtr annWorld;    /* the annotation world */
    Boolean     dirty;       /* if dirty then needs to be saved */
    Rect        dRect;       /* destination rectangle for zooming */
```

This slot is added to accommodate PCW type windows.

```
    FrameInfo   *frameInfo;  /* frame information for PCW window types */
}WindowData, *WindowDataPtr, **WDHandle;
```

The LCPS_PARAMS structure specifies parameters and laser printer instructions needed for the ACR-NEMA print messages. The structure is filled in first for each image to be printed and is then submitted for final merging into the print message:

```
typedef struct LCPS_PARAMS
{
    char    msg_set_id[80];  /* Unique id string. */
    short   format;          /* images per page */
    short   page_pos;        /* position of image on page */
    char    borders[6];      /* border color */
    char    invert[8];       /* Image video inversion */
    short   copies;          /* number of copies to print */
    char    print[6];        /* Print command */
    short   overlayID;       /* Id for image overlay to print */
    short   imageCount;
    short   templateID;
    long    (*callbackRoutine)(long status, void *arg);
    void    *callbackArg;
    IIM_IMG_INFO *image;     /* Image info for messge. */
} LCPS_PARAMS;
```

The PRINTER_INFO structure specifies the logical name, parameters, and status information about the currently selected printer:

```
typedef struct PRINTER_INFO
    {
    char    name[80];
    FILMS   films[11];
    char    currFilm[10];
    short   filmCount;
```

-continued

```
    char    formats[80];
    short   avail;
    short   status;
    int     font;
    int     fontSize;
    int     charWidth;
    }PRINTER_INFO;
```

The FILMS structure specifies available film sizes for the selected printer:

```
typedef  char FILMS[10];
```

PCW Return and Error Codes

The following directives specify the various condition codes returned to calling functions.

```
#define PCW_Err            -1   /* General error */
#define PCW_NoErr           0   /* General no
                                   error */
#define PCW_NoPCW           2   /* Not a PCW
                                   window */
#define PCW_FileOpenErr     3   /* Could not open
                                   file */
#define TMPLTSNotLoaded     4   /* Text templates
                                   are not loaded */
#define PCW_NullFrame       5   /* Frame pointer is
                                   NULL */
#define PCW_NoFrames        6   /* No frames for this
                                   windowe. */
```

-continued

| | | |
|---|---|---|
| #define PCW_INSUFFTMPLTMEM | 7 | /* Insufficient memory to load templates */ |
| #define PCW_IDOUTOFRANGE | 8 | /* ID number was out of legal range. */ |
| #define PCW_INSUFFDOMEMEM | 9 | /* Insufficient dome memory to move image */ |
| #define PCW_NOTDOMEDEV | 10 | /* Device is not a DOME device */ |
| #define PCW_SCREENLOCK | 11 | /* Image is locked for ICU */ |
| #define PCW_TOOMANYIMGS | 12 | /* Too many images to rearrange format. */ |
| #define PCW_DIFFPATIENTS | 13 | /* Different patient is currently displayed */ |
| /* printer codes */ | | |
| #define PCW_PRINTERR | 50 | /* General printing error */ |
| #define PCW_MIXTMPLTS | 51 | /* Mixed template ids on a single row */ |
| #define PCW_UNKNOWNMOD | 52 | /* Unknown image modality */ |
| #define PCW_IMAGEOVRLD | 53 | /* Image Overload... Camera film height or width violation. */ |
| #define PCW_DIFFSIZES | 54 | /* Different image+ padding sizes per row */ |
| #define PCW_NOPRINTINFO | 55 | /* No Printer Info for a printer. */ |
| #define PCW_NOPRINTERS | 56 | /* No Printers defined in config */ |
| #define PCW_PRINTERNOTDEFINED | 57 | /* The current printer is not defined in the config paragraph */ |
| #define PCW_PRINTINGDISABLE | 58 | /* The printing disabled preference is selected. */ |
| #define PCW_INVALIDFORMAT | 59 | /* The selected format is invalid for printing. */ |
| /* Overlay codes */ | | |
| #define PCW_NOTENOMEM | 80 | /* Not enough memory to create overlay. */ |
| #define PCW_OVLEXISTS | 81 | /* Overlay already exists. */ |
| #define PCW_NOSCOUTS | 82 | /* No scouts for the image. */ |

In a preferred embodiment, PCW applications are programmed as C language functions. Functions that perform logically related tasks are grouped as application modules during program development. All programmed functions in a module are then stored as a file, and named in the header fie. In one example of a preferred embodiment, PCW contains the following application modules: ARRANGE, COMMUNICATIONS, DIALOG, FONTS, FRAMES, GLOBALS, PULL-DOWN MENUS, OVERLAY, PRINT, SCOUTS, SOFT KEYPAD, TEMPLATES, UTILITIES, and WINDOWS.

A detailed source code listing for these modules is contained in the Software Microfiche Appendix. The operations carried out by the source code of preferred embodiment, PCW, are self-explanatory to a person of ordinary skill in the art with a working knowledge of the C programming language and the Macintosh operating systems, its ability to use windows and frames, and to add layers of functions. Also, the Macintosh operating system's ability to receive operator input from mouse and keyboard, and to display output on the video display screen is well known by those skilled in the art. Consequently, a detailed description of each and every one of these functions in the preferred embodiment is not necessary to understand the present invention. However to emphasize some of the non-obvious features of the present invention, the ARRANGE, PULL-DOWN MENUS, PRINT, COMMUNICATIONS, FRAMES, and WINDOWS modules are described. The descriptions are presented in the alphabetical order of the module names.

The ARRANGE module is responsible for the creation, display, and handling of mouse clicks within the Arrange pull-down menu. The pull-down menu is not a conventional pull-down menu with vertical rows of pull-down menu items but rather it is a window with a dynamically drawn PICT of PCW formats. The functions in this module are responsible for interpreting the mouse clicks within the Arrange pull-down menu and mapping the mouse points to the formats in the PICT.

The communications module provides the interface between the PCW interface and the ACR NEMA (AN) communications routines. It is responsible for the creation and submission of PCW printing parameters to the AN routines.

The PCW_BuildInitMessage function constructs an AN_PUT_ELE array within a limited set of the field values contained in the <params> parameter. The fields used are those required only once per message set. The put element array is then sent to the comm functions which cream the message containing these elements.

| | |
|---|---|
| short | PCW_BuildPrintImageMessage(LCPS_PARAMS *params) |

The PCW_BuildPrintImageMessage function builds a print image message.

| | |
|---|---|
| short | PCW_BuildTerminalMessage(LCPS_PARAMS *params) |

The PCW_BuildTerminalMessage function builds a terminal message.

| | |
|---|---|
| short | PCW_BuildCompleteMessage(LCPS_PARAMS *params) |

The PCW_BuildCompieteMessage function builds the complete message.

| | |
|---|---|
| short | PCW_SubmitCommInfo(AN_PUT_ELE *pe, int pn_cnt, short templateID, IIM_IMG_INFO *image, LCPS_PARAMS *params) |

The PCW_SubmitCommInfo function builds a new XCB and fills in the information from the <pe> parameter. Overlay group numbers and text template information is added to the message. When the message construction is complete, the XCB is activated.

| | |
|---|---|
| void | PCW_InitializeLCPSmsg(LCPS_PARAMS *params) |

The PCW_InitializeLCPSmsg function initializes <params> so that the calling function can reset specific ones and the others can have harmless defaults.

```
short  PCW_MsgXmitErr(cntl_arg, r)
```

The PCW_MsgXmitErr function is the callback for message transmission timeout errors.

```
short  PCW_QueryPrinter(char *printer)
```

The PCW_QueryPrinter functioll creates the message set id, fills in the put elements, and submits them for transmission.

```
void  PCW_CreateMsgSetID(char *src_name, char *msgid)
```

The PCW_CreateMsgSetID function converts source host name to a network address and creates the message set id for each image message.

```
short  PCW_PrinterQueryResponse(void)
```

The PCW_PrinterQueryResponse function is not implemented. Printer information is in the config file until query communications are defined.

```
short  PCW_AddTextElements(QHD *image_hdr, short templateID)
```

The PCW_AddTextElements function does some template verification and reads the text template from the header file, Then it merges the template message into the current image message,

```
short  PCW_AddOverlayGroups(QHD *vp_sys_buf_q, QHD
       *image_hdr, IIM_IMG_INFO *image, Boolean
       scouts_only)
```

The PCW_AddOverlayGroups function collects all the relevant overlay groups and adds them into the message header.

```
void  PCW_MapOverlays(register QHD *q, IIM_ANN_INFO_PTR
      ann, char *grps)
```

The PCW_MapOverlays function collects the overlay group numbers for each annotation in an images annotation queue.

```
void  PCW_MapScoutsOverlays(register QHD *q,
      IIM_ANN_INFO_PTR ann, char *grps)
```

The PCW_MapScoutsOverlays function overlays scout lines.

The DIALOG module provides various convenient dialog functions, They are general dialog related functions designed to reduce some of the overhead required by the regular Toolbox dialog functions, This module also defines some PCW specific functions which provide user input via dialog, The FONTS module provides font related functionality such as scaling and font matching for external devices, The FRAMES in a preferred embodiment, acts as a frame manager responsible for performing, defining and maintaining frame information for a PCW window.

Examples of the Frames functions in a preferred embodiment follow:

```
void  PCW_ArrowKeySelectFrame(WindowPtr window, short key)
```

The PCW_ArrowKeySelectFrame function selects frames indicated by the direction of an activated arrow key.

```
void  PCW_SelectFrame(WindowPtr window, Point pt, Boolean
      multiple)
```

The PCW_SelectFrame function checks the frames to see if the coordinates of the mouse pointer, <pt>, are within its boundaries. This takes care of highlighting selected frames and selection of multiple frames when the user clicks on a frame. It then sets selected frames to selected or not selected

```
FrameRecord  *PCW_FindFrame(WindowPtr window, Point pt)
```

The PCW_FindFrame function looks at the frames and finds the one that contains the coordinates of the mouse click. Assigns <frame> to the pointer of the frame record found. If the mouse click was not inside of any frame, the function returns FALSE.

```
FrameRecord  *PCW_GetSelectedFrame(WindowPtr window)
```

The PCW_GetSelectedFrame function checks the frame records for <window> and returns the frame pointer that has its <selected> flag set to TRUE.

```
void  PCW_HiliteFrame(FrameRecord *frame)
```

The PCW_HiliteFrame function draws a border around <frame>.

```
void  PCW_DrawFrame(FrameRecord *frame)
```

The PCW_DrawFrame function draws the image, annotations, and overlays for <frame> contained in <window>.

```
void  PCW_DrawFrameImageOnly(FrameRecord *frame, Boolean
      erase)
```

The PCW_DrawFrameImageOnly function draws only the image into a frame.

```
void  PCW_DrawFrameImageStuff(FrameRecord *frame)
```

The PCW_DrawFrameimageStuff filnction draws annotation text, overlay graphics, and scout lines into a frame.

```
IIM_IMG_INFO  *PCW_GetFrameImage(FrameRecord *frame)
```

The PCW_GetFrameImage function gets and returns the image_info field of <frame>. short PCW_

TransferFrameImage(FrameRecord*src_fr, FrameRecord*dst_fr, Boolean refresh) The PCW_TransferFrameImage function transfers all image related data from a first frame <src_fr> to a second frame <dst_fr>.

---
short PCW_InsertFrameImage(IIM_IMG_INFO *imageInfo, FrameRecord *frame, FrameRecord *src_frame, Boolean refresh)
---

The PCW_InsertFrameImage function determines where each image is coming from and transfers all the image related data to the destination <frame>.

---
short PCW_ReplacePDSImage(Point pt,FrameRecord *frame)
---

The PCW_ReplacePDSImage function creates a new PDS window and transfers all image related data.

MyGWorldPtr PCW_GetFrameWorld(FrameRecord *frame) The PCW_GetFrameWorld function gets and returns the frame's main offscreen drawing world pointer, <annWorld> field of <frame>.

---
long PCW_Lock_Unlock_PatientQ(IIM_IMG_INFO *imageInfo, int lock_unlock)
---

The PCW_Lock_Unlock_PatientQ function calls the memory manager to lock or unlock the patient queue depending on the value of <lock_unlock>. When an image is dragged from a PDS window to a PCW window, the patient queue must be locked so the image manager does not purge it.

---
void PCW_RemovePDSImageFromDispQ(IIM_IMG_INFO *imageInfo)
---

The PCW_RemovePDSImageFromDispQ function calls the memory manager routines to remove the image data from the display queue.

---
void PCW_CheckAndRemovePDSImage(register QHD *q, IIM_IMG_INFO_PTR theImage, WindowPtr arg)
---

The PCW_CheckAndnemovePDSImage function is a call back routine for the memory manager during que_map. It compares a selected image with the incoming window and removes the image from the queue if the windows are the same.

---
void PCW_MaximizeDrect(FrameRecord *frame)
---

The PCW_MaximizeDrect function adjusts <frame> dRect to be close to the image h/w ratio.

---
Rect PCW_GetFrameDrect(FrameRecord *frame)
---

The PCW_GetFrameDtect function returns the destination rectangle for frame.

---
void PCW_OverlaySwitch(WindowPtr window)
---

The PCW_OverlaySwitch function is basically a redirection of the PDS call as to redraw all frames.

---
void PCW_RedrawAllFrames(WindowPtr window)
---

The PCW_RedrawAllFrame function redraws all frames.

---
void PCW_DeleteFrameImageInfo(FrameRecord *frame, Boolean purgeImage, Boolean redraw)
---

The PCW_DeleteFrameImageInfo function deletes all image related information and pointer to a frame.

---
FrameRecord *PCW_GetImageFrame(IIM_IMG_INFO *image)
---

The PCW_GetImageFrame function finds and returns a pointer to the frame that contains the image.

---
FrameRecord *PCW_FindNextFrameImage(WindowPtr window, int *start_index)
---

The PCW_GetImageFrame function loops through the frame array to find the next frame with an image.

---
FrameRecord *PCW_FindPreviousFrameImage(WindowPtr window, int *start_index)
---

The PCW_FindPreviousFrameImage function finds the previous frame with an image.

---
void PCW_ParseFrameTemplate(FrameRecord *frame)
---

The PCW_FindPreviousFrameImage function parses the frame template.

---
void PCW_InvertFrameImage(FrameRecord *frame, Boolean update)
---

The PCW_InvertFrameImage function is called by the PULL-DOWN MENUS module or the Template dialog box to invert a frame image.

---
void PCW_ViewFrame(FrameRecord *frame)
---

The PCW_ViewFrame function is called by the PULL-DOWN MENUS module to move a selected composition frame image into the View window.

---
FrameRecord *PCW_FindIndexFrame(WindowPtr window, int row, int col)
---

The PCW_FindIndexFrame function steps through the current matrix dimension to find the frame index.

---
int PCW_MaxFrameRowWidth(WindowPtr window)
---

The PCW_MaxFrameRowWidth function finds the widest row in a frame.

---
int PCW_MaxFrameRowHeight(WindowPtr window)
---

The eCW_MaxFrameRowHeight function calculates the total height of images in a composition frame.

---
void PCW_RefreshFrame(FrameRecord *frame)
---

The PCW_RefreshFrame function temporarily selects a frame and redraws it when an image is flipped or rotated.

---
void PCW_FlipFrameImage(WindowPtr window, FrameRecord *frame, short item, Boolean flipAll)
---

The PCW_FlipFrameImage function flips a frame image.

---
void PCW_RotateFrameImage(WindowPtr window, FrameRecord *frame, short angle, Boolean flipAll)
---

The PCW_RotateFrameImage function rotates a frame image.

---
int PCW_TotalImageMemory(WindowPtr window)
---

The PCW_TotalImageMemory function calculates the total memory required by all images in a PCW window.

---
short PCW_MoveImageDevices(WindowPtr window, short from_slot, short to_slot)
---

The PCW_MoveImageDevices function reassigns all image device slot numbers when the user drags a window.

In a preferred embodiment, the GLOBALS module defines global variables used by PCW and other modules. The PULL-DOWN MENUS module handles pull-down menu selections in the PCW pull-down menu as well as manage the enabling and disabling of pull-down menu items based on various operating conditions in a preferred embodiment. Illustrative examples of the pull-down menu functions follow:

---
void PCW_DoPCWmenu(short item)
---

The PCW_DoPCWmenu function is called when PDS detects actuation of the PCW pull-down menu items, or when the softkeys are actuated. Depending on which item the operator selects, the corresponding process represented by that item is carried out.

If New PCW is selected, the processor branches to the WINDOWS module.
If PCW Defaults is selected, the processor branches to the DIALOG module.
If Frame Setup is selected, the processor branches to the DIALOG module.
If View Frame is selected, the processor branches to the FRAMES module.
If Refresh Window is selected, the processor refreshes the window and branches to the WINDOWS module.
If Hide/Show Templates is selected, the processor branches to the TEMPLATES module.
If Invert Borders is selected, the processor branches to the WINDOWS module.
If Invert Image is selected, the processor branches to the FRAMES module.
If Auto Fill is selected, the processor branches to the PRINT module.
If Auto Print is selected, the processor branches to the PRINT module.
If Select Printer is selected, the processor branches to the PRINT module.

---
void PCW_AdjustMenus
---

The PCW_AdjustMenus function enables or disables (dims or grays) pull-down menu items under certain operating conditions. For example, Auto Print is enabled only if images are displayed and communications are established with the target printer. Certain items are disabled if the current window is not the PCW window.

---
void PCW_DoArrangeMenu(short item)
---

The PCW_DoArrangeMenu function handles mouse clicks inside the Arrange menu to take care of updating, dragging, and item selection. Then it updates the PCW window with the new frame layout.

The OVERLAYS module is responsible for drawing the scout overlay. The PRINT module provides routines that initiate and conduct the printing of image data. It is responsible for collecting all necessary formatting information and submitting it to the communications module for final ACR-NEMA message generation. It also provides printer selection and verification functionality.

Print Functions

---
void PCW_DoAutoPrint
---

The PCW_DoAutoPrint function directs the automatic printing of all images queued in the PDS window. It pops up the Printer Selection dialog box. It calls PCW_AutoPrintPDSimages to print the queued PDS images. It calls PCW_PreloadPDSimages to set up preloading.

---
void PCW_OpenPrintStatusDialog
---

The PCW_OpenPrintStatusDialog function pops up the Print Status dialog box.

---
void PCW_HandlePrintStatus(DialogPtr dlg, short item Hit)
---

The PCW_HandlePrintStatus function receives user input from the Print Status dialog box.

| void PCW_ClosePrintStatusDialog(DialogPtr dlg) |
|---|

The PCW_ClosePrintStatusDialog function closes the Print Status dialog box.

| void PCW_UpdatePrintStatus(DialogPtr dlg) |
|---|

The PCW_UpdatePrintStatus function updates displayed dialog items or helps screen refresh.

| void PCW_PrintStatusMessage(Str255 msg, Boolean refresh) |
|---|

The PCW_PrintStatus Message function prints the status message into print status window.

| void PCW_PrintWindow(WindowPtr window) |
|---|

The FCW_PrintWindow function prints images in the current PCW window.

| void PCW_AutoPrintPDSimages(Boolean remove_image) |
|---|

The PCW_AutoPrintPDSImages function traverses the image queue and submits all the images to the communications functions.

| void PCW_PreloadPDSimages(WindowPtr window) |
|---|

The PCW_PreloadPDSimages function fills in all vacant frames in the PCW window with PDS images.

| WindowPtr PCW_SetupPreLoadWindow |
|---|

The PCW_SetupPreLoadWindow function set up the preload window.

| void PCW_UpdateAutoPrintWindow(WindowPtr window) |
|---|

The PCW_UpdateAutoPrintWindow function redraws all PCW frames.

| long PCW_HandleAutoPrintEvent(EventRecord *event) |
|---|

The PCW_HandleAutoPrintEvent function exists only to handle the update event so that this window can be drawn correctly.

| void PCW_SelectPrinter |
|---|

The PCW_SelectPrinter function is called by the PULL-DOWN MENUS module when the Printer Select pull-down menu item is activated. It then pops up the PCW Printer Selection dialog box.

| short PCW_AutoPrintPageCheck(short *images) |
|---|

The PCW_AutoPrintPageCheck function walks the queue of PDS images and determines how many will fit on the selected film size.

| short PCW_VerifyPrinter(char *printer) |
|---|

The PCW_VerifyPrinter function looks through the printer fist to find the current printer.

| short PCW_CheckPrinterConstraints(WindowPtr window) |
|---|

The PCW_CheckPrinterConstraints function is called by PCW_PrintWindow to check compossed frame image attributes to compare with selected film size.

The SCOUTS module is responsible for drawing scout lines into a PCW frame, if the original image had none. The Soft Key Pad module adjusts the enabling of the soft key pad buttons based on current conditions. It is also responsible for handling clicks to the PCW buttons. The TEMPLATES is responsible for the accessing and manipulation of text template information. The UTILITIES module provides various routines that can be termed "utility" functions. The WINDOWS module is responsible for the creation of PCW windows and provides window related operations. Some examples of the windows functions in a preferred embodiment follow:

| WindowPtr PCW_NewWindow |
|---|

The PCW_NewWindow function creates a new window and initializes the data fields.

| void PCW_CloseWindow(WindowPtr window) |
|---|

The PCW_CloseWindow function closes the current window

| void PCW_UpdateWindow(WindowPtr window) |
|---|

The PCW_UpdateWindow function call the frame drawing routine for each of the frames associated with <window>.

| long PCW_ClickWindow(WindowPtr window, EventRecord *theEvent) |
|---|

The PCW_ClickWindow function finds the local coordinates of the mouse click location and then selects the frame click on, if any.

| void PCW_GenerateGrid(WindowPtr window, Rect *bounds, short rows, short columns) |
|---|

The PCW_GenerateGrid function draws a grid of <rows> rows and <columns> columns in the currently selected window. Checks if the currently selected window is a PCW window.

```
Boolean IsPCWWindow(WindowPtr window)
```

The IsPCWWindow function determines if <window> is a PCW window.

```
void PCW_DragImage(WindowPtr whichWindow, Point pt)
```

The PCW_DragImage function is called when mouse is clicked and held on a PDS window or PCW frame image. While mouse is held down, a drag grey region is drawn on the screen. When the mouse is released over a PCW frame, the image is transferee to the frame. If released outside of the PCW window, the image is restored and redrawn in its original PDS window.

```
void PCW_AdjustCursor(Point mousePt, WindowPtr inWindow)
```

The PCW_AdjustCursor function displays the appropriate cursor (pointer) symbol for the tool selected in the image or annotation palette.

```
void PCW_CalculateContent(Point mousePt, RgnHandle contentRgn)
```

The PCW_CalculateContent function calculates the area of sensitivity within composition frames where an appropriate PDS cursor (pointer) symbol is to be displayed.

```
Boolean PCW_ContainsImages(WindowPtr window)
```

The PCW_ContainsImages function determines if any of the frame structures in <window> contain image information.

```
short PCW_AutoInsertImage(WindowPtr PDSwindow, WindowPtr PCWwindow)
```

The PCW_AutoInsertimage function Inserts the image in <window> into the first vacant frame of the current PCW window. Returns TRUE if insert was performed, FALSE otherwise.

```
Rect PCW_CalcWindowSize(Rect rect)
```

The PCW_CalcWindowSize function calculates the PCW window size that maximizes <rect> and has the same aspect ratio as gPCW_hw_ratio, which is an estimate of the camera film height/width ratio.

```
void PCW_InvertWindowBorders(WindowPtr window, Boolean refresh)
```

The PCW_InvertWindowBorders function toggles the border value for a selected window.

```
int PCW_GetImageCount(WindowPtr window)
```

The PCW_GetImageCount funtion counts images in a PCW window.

```
void PCW_DragWindow(WindowPtr whichWindow, EventRecord *event)
```

The PCW_OragWindow function is called by the event handler to let the user drag a window.

```
void PCW_SelectNextImage(WindowPtr window)
```

The PCW_SelectNextImage function selects the next image.

```
void PCW_SelectPreviousImage(WindowPtr window)
```

The PCW_SelectPreviousImage functiorl selects the previous image.

```
void PCW_RelockQueues
```

The PCW_RelockQueues function relocks the PDS patient image queues.

```
Boolean PCW_WindowFull(WindowPTR window)
```

The PCW_WindowFull function is called by the Pulldown menus module to assure that there are PDS images available for auto-printing.

In describing the invention, reference has been made to a preferred embodiment. However, those skilled in the art and familiar with the disclosure of the invention may recognize additions, deletions, substitutions, or other modifications which would fall within the scope of the inventions defined in the claims. For example: in an alternative example of a preferred embodiment, the present invention is designed to provide free formatting of images. Images may be placed arbitrarily into the PCW window and scaled to different sizes. A graphical interface allows the operator to arrange images and text more suitable to individualized or special needs.

In another alternative example of a preferred embodiment, the present invention is designed to provide pan and zoom. Currently ACR-NEMA does not facilitate Pan and Zoom values. Images sent to the laser camera can be printed at other than their original orientation. The addition of these parameters to ACR-NEMA allows for image alteration in the PCW window.

In another example of a preferred embodiment, the present invention provides the capability to choose any submitted print job and remove it from the print queue.

In another example of a preferred embodiment, the present invention provides the capability to query the printer. As printers become more sophisticated the ability to make queries regarding specific printer parameters will allow for greater flexibility in PCW compositions. The different states of a camera (out of film, film jam, time-out could be relayed to the user. If the PCW queries the printer for this and other kinds of information, such as film sizes, page formats, and fonts available; the configuration file can be eliminated. In another example of a preferred embodiment, the present invention provides the capability to print reports will enhance the detail of information for each PCW document. Reports may be added either as bit maps or, when the Text feature is available, directly or as ASCII text.

In another example of a preferred embodiment, the present invention provides the capability to save PCW compositions in an archive device and then recall them later. The method of retrieving stored images will be similar to the way PDS currently opens images via the Open dialog. Now, PCW only composes images and prints them locally, but the composition cannot be saved for future reference. PCW provides the means for the non-programmer operator to select an existing PCW composition document residing in archive storage and have it sent directly to the laser camera for printing.

In another example of a preferred embodiment, the present invention provides the capability to allow the non-programmer operator to layout and define how patient demographic information is presented in free-form on the film. In another example of a preferred embodiment, the present invention provides the capability to select and save page defaults for specific modalities. Provide the user with a set of routines to Autoprint PDS images. This option allows the user to choose a print routine that best suits the needs of schedules (speed) or of materials (images per page). In another example of a preferred embodiment, the present invention provides the capability to display, generate, and print multiple overlays for any image. In another example of a preferred embodiment, the present invention provides the capability to include PCW folders that will contain PCW documents or other folders.

In another example of a preferred embodiment, the present invention provides the capability to provide additional pixel padding so that images of different size could be printed in a PCW window, print only text in a PCW frame, and duplicate an image into another PCW frame and let the operator manipulate it and change the priority within the print queue. The preferred embodiment provides the capability to upgrade and to incorporate and use new developments through the use of macros, dynamic information lines, context sensitive help, and additional protocols (HC-7, ISDN, X.nn, NTP, etc.).

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

Glossary of PCW Terms

This glossary defines, discusses, or explains terms as they apply to the PCW. Italicized terms also appear as glossed words. Application developers may use slightly different meanings for some of these terms, but the definitions are given from the user's point of view. Cross-references are given for related or contrasting terms.

| GLOSSED WORD | DEFINITIONS |
| --- | --- |
| activate | In PCW, to make a program command available for use by means of an appropriate point and pick operation. Such operations are interpreted by the event handlers and carried out by the application modules. |
| active window | The frontmost window on the desktop; the window where the next action will take place. The active window's title bar is highlighted. |
| alert | A warning or report of an error in the form of an alert box or computer beep, or both. |
| alert box | A dialog box that is displayed on the workstation screen to give a warning or to report an error during the use of an application program. |
| annotate | See image composition. |
| attribute | A characteristic or property; for example, the kind of modality that captured a medical image, or a patient's name. See parameter, and value. |
| bit image | A collection of bits in memory that has a 2- or 3-dimensional matrix representation. These representations are typically displayed as visible images on the workstation screen. |
| bit map | A set of bits that represents the position and state of corresponding items. See pixel. |
| bit-mapped graphic | A method of representing digital computer images in which each pixel on a display corresponds to a bit (or set of bits) in memory, to allow each pixel to be controlled. |
| choose (or select) | Pointing and clicking or using a keyboard equivalent to make a choice, such as selecting a command from a menu or activating a soft key. |
| click | Move the mouse as to position the pointer on something, then press and release the mouse button without moving the mouse. (See double click.) |
| clipboard | The holding place for what you last cut or copied. |
| close | To remove a window from the desktop. |
| close box | The small white box on the left side of a title bar. Clicking this box closes an active window. |
| command | A word or phrase, usually in a menu, describing an action for the computer to perform. |
| compose | See image composition. |
| composition frame | One of the set of row-column layouts that can be selected for the composition of new medical images. The operator can choose layouts from a set provided in the Arrange palette. |

-continued

| GLOSSED WORD | DEFINITIONS |
|---|---|
| composition window | A PCW window, titled Print Composition or AutoPrint Worksheet. The operator uses these windows to choose the frame layout for the composition of new medical images. |
| configuration file | A data file used by application software to provide information about the kind of peripheral devices and the physical/ mechanical properties. It describes the devices, optional features, system or communication parameters, and other programs installed. |
| consistent format | One of the concepts of design guidelines for graphics user interfaces. This concept provides that each appearance of similar objects resemble each other. |
| critical care area | One of the areas or departments in a hospital. Patients there are in life threatening condition. |
| customize | In user-oriented programming, allowing the operator to define user or situation preferences for values of operating parameter or to use preset default values. |
| data entry/ retrieval | The actions of a workstation operator to submit/ receive information. |
| dedicated device | Typically in proprietary configurations, a dedicated device is hardwired to its controller. Otherwise, a dedicated device may be one such as a printer that is used only for x-ray film prints. |
| default value | A predetermined attribute, option, or value that is assumed when no other is explicitly specified. |
| desktop | The Macintosh working environment - the menu bar, any window or dialog box, and the remaining gray area on the screen. |
| dialog box | A kind of window containing a message that instructs or that can request more information from you. The message can be a warning that you're asking your computer to do something it cannot do or that you're about to destroy some information. A dialog box can require the operator to furnish a response before continuing; or may permit the operator to access and use other windows before disposing of the dialog box. In some cases a beep accompanies the opening of a dialog box. |
| dimmed command | A command that appears half-lighted compared to other commands in the menu. You cannot click such a disabled command. A commands is disabled while the action it represents is temporarily inappropriate. |
| dimmed icon | An icon that represents a disk that has been ejected, or a document, folder, or application on a disk that has been ejected. Dimmed disk or folder icons can be selected and opened, but the documents and applications on them can't be opened. |
| direct manipulation | The action of using a mouse or pointing device to move graphical representations around on the workstation display screen. |
| disk | The magnetic medium that the computer uses for storing information. |
| double-click | Position the pointer where you want an action to takeplace. Then press and release the mouse button twice in quick succession without moving the mouse. (See click.) |
| dragging | Moving an object around the screen as if it were attached to the pointer. Performed by holding the select mouse button and moving the pointer. When you release the mouse button, you either confirm a selection or move an object to a new location. |
| drawing palette | One kind of pull-down menu. In PCW, the palette that contains the tool icons used for entering text or drawing on the composition frames. |
| editing | See image composition. |
| editing session | The period while the operator is composing new images in the Print Composition or AutoPrint Worksheet windows. |
| entering text | In PCW, the operator can make textual annotation on medical images in the composition frame by using the drawing palette and the text entry tool. |
| feedback | People expect physical actions at a workstation to have physical results. For example, when a drawing tool moves, an operator expects to see a line drawn. Physical results are quickly displayed to provide this assurance. |
| file | A collection of related data stored and retrieved by an assigned name. |
| folder | Holds documents, applications, or other folders on the desktop. Folders allow you to organize information in any way you want. |
| format | A specific arrangement of a set of data. See protocol. |
| font | A collection of letters, numbers, punctuation marks, and other typographical symbols with a consistent appearance. |
| frontmost | The active or selected image (or window) on the desktop. |
| grafPort | The data type for a graphics port, or the shorthand for the graphics port. |
| graphics user interface | In modern computer environments, the use of a fairly high resolution video monitor and bit-mapped graphics to give a WYS/WYG appearance to the objects and images represented on the display screen. |
| grow box | A box on the bottom-right corner of some active windows that lets you resize the window. |
| hard disk | A disk drive that is permanently encased. In PCW, the site of local database storage. |
| highlight | To make something visually distinct from its background, usually to show that it has been selected or chosen. |
| I-beam | A type of pointer used in entering and editing text. |

-continued

| GLOSSED WORD | DEFINITIONS |
|---|---|
| icon | A graphic representation of an object, a concept, or a message. |
| industry standard communication format | The medical computing industry has adopted the ACR-NEMA communication standard. In PCW, this standard is followed in formatting messages to include all portions of information that make up the PCW document. |
| image (actions) | Images can be captured (acquired from the source modality), stored (locally, or remotely) (temporarily for a short time or archived for a long time), retrieved from local or remote storage, viewed, previewed, adjusted, manipulated, and composed. |
| image composition | In PCW, the operator has various tools to accomplish several tasks in composing new images or editing previously composed images. These tasks are: adjusting the image characteristics, adding templates or scout lines, annotating by entering text or drawing on the images, editing images by inserting, changing, or deleting information, and arranging the layout when printing multiple images on one single film page. |
| image palette | One kind of pull-down menu. In PCW, the palette that contains the tool icons used for adjusting the image properties in the composition frames. |
| invisible window | One attempt to reduce the amount of information visible on a workstation screen provided means that information and commands are hidden from the operator's view until "hot spots" redetermined points of activation) are selected. |
| laser film printer | In medical applications, film-page printers with a laser beam as the exposure means. |
| mask | A bit pattern used to filter, screen, or set/reset desired bits. |
| medical diagnostic image | In medical applications, images captured on film pages. The source of typical medical images is one or more of the radiographic, sonic, or nuclear imaging modalities. |
| menu | A list of commands that appears when you press and hold the mouse button while pointing to a menu title in the menu bar. As you continue to hold the mouse button and move the pointer through the list, each command is highlighted as the pointer moves over the commands. You select the highlighted command when you release the mouse button. |
| menu title | A word or phrase in the menu bar designating one pull-down menu. |
| menu bar | In PCW, the horizontal strip at the top of the PDS window that contains the action items currently available to the operator. |
| modality | Generic term for the various kinds of medical image producing devices; for example x-ray, CAT scan, magnetic resonance, gamma cameras, or ultra-sound. |
| mouse | A kind of pointer device you move on a flat surface. As you move the mouse, the pointer on the screen moves a proportionate distance in the same direction. |
| mouse button | A control button on the mouse. See click, double click, drag, highlight, choose, select, activate. |
| open | To create a window so you can view a list or medical images. |
| operating system | The Macintosh software program that organizes the actions of parts of the computer and its peripheral devices. It handles low level tasks such as memory management, port control, and disk input and output. |
| optical storage device | A kind of mass data storage device in which the recording medium is optical laser platters. |
| option | A selectable action item on a menu. |
| (PACS) picture archival and communication system | In medical applications, a computer based system that permits the user to capture, store, retrieve, manipulate, archive, and transmit medical diagnostic images. With PCW the user can also compose new images, based on previously captured images and translate the images into the ACR-NEMA communication format. |
| parameter | The information supplied by a program or user to an application program, usually in menu commands, dialog boxes, or preset defaults. Some applications use configuration files to store parameters for "data forms," or information about peripheral devices. See attribute, value. |
| patient list (queue) | A queue of selected patient images used for viewing next or previous patient or image. |
| pixel | From the words "picture element." Pixels exist at all times, only their color changes. A pixel is the area on screen that is lighted by one bit of data. |
| point and pick | The concept of point and pick describes the actions of using pointer devices (such as a mouse, trackball, touch-screen, or stylus) to select objects or commands. See click, double click, drag, highlight, choose, select, activate. |
| pointer | A small shape on the screen, most often an arrow pointing up and to the left, that follows the movement of the mouse. See I-beam. |
| pointer device | A computer input device such as a mouse, trackball, touch-screen, or stylus. Workstation operators use these devices for point and pick actions as well as drawing. |
| preferences | Alternate or favorite combinations of control settings useful in particular situations. The preferred settings can be saved in preference sets, and deleted when no longer useful. |
| print routines | In PCW, the software modules that build the various message formats |

| GLOSSED WORD | DEFINITIONS |
|---|---|
| | for sending images to storage or printers. See industry standard communications format. |
| printer device | See laser film printer. |
| protocols | In network communications, various sets of standard rules that govern the operation of functional units of a communications system that must be followed if communication is to take place. See industry standard communications format. |
| scout lines | In PCW, lines that indicate the various "elevations" where other images (like slices) were made. |
| scroll | To move an area or a list in its window so that you can see a different part. |
| scroll arrow | An arrow on either end of the scroll bar. Clicking a scroll arrow moves the area or the list one increment. Clicking and holding a scroll arrow scrolls the area or the list continuously, until the button is released. |
| scroll bar | A rectangular box that may be along the right or the bottom of a window. Moving the scroll bar causes the view in the window to change. |
| scroll thumb | The white box in a scroll bar. The position of the scroll thumb in the scroll bar indicates the position of what is visible in the window relative to the total area or the entire list. |
| select (choose) | To designate where the next action will take place. To select, you click or drag across information. |
| selection | The information affected by the next command. The selection is usually highlighted. The insertion point is also a selection. |
| Soft Keypad | A series of keys, represented as button icons, that are used for selecting PDS functions. In PCW, AutoFill and AutoPrint |
| software | Programs, or instructions for the computer to carry out. |
| storage device | In PCW, magnetic or optical media used as either local, or remote database. |
| text | In PCW, character data that can be superimposed on medical images. |
| text template | In PCW, information that resembles the text variable names on a, data form, but also contains formatting that presents the actual values of the variables. |
| title bar | The horizontal bar at the top of a window. Plain text names the contents of the window. You can use the tide bar to move the window on the desktop. This bar is highlighted if the window is active. See close box, zoom box. |
| value | A specific occurrence of an attribute; for example, "Sam" for a patient name. A value is the quantity assigned to constants, parameters, variables, or symbols. |
| window | An area displaying information on the desktop. More than one window may be open. You view lists and medical images through a window. You can open or close it, move it on the desktop, sometimes change its size, edit its contents, and scroll through its lists and images. |
| window and level | Shorthand term for image window width and range of brightness and contrast. |
| workstation | In PCW, the PDS computer, monitor, keyboard, pointer device, and optional PCW software. It can be configured on a network with other Vortech systems, such as the IARS (Image Archive and Retrieval System) or MIG (Medical Image Gateway). It can be configured to work with other vendor's systems, such as Eastman Kodak's IMAGELINK. |
| WYSIWYG composition | In the word processing world, What You See Is What You Get, referring to the ability of the system to faithfully display on a screen and reproduce on a printer the same image. This processing concept assures that the operator is in control of the content and format (spatial layout and font choice) of the document. This also means that the computer quickly and directly displays the result of the operator's choices. |
| zoom box | The small box on the right side of the title bar of some windows. Clicking the zoom box expands a window to its maximum size Clicking again returns the window to its opening size. |

What is claimed is:

1. A method for composing medical diagnostic imagery comprising the steps of:

transmitting a medical diagnostic image from a first type modality to a workstation;

transmitting a medical diagnostic image from a second type modality to a workstation;

loading the medical diagnostic image from the first type modality into a second frame of a window;

loading the medical diagnostic image from the second modality into a frame a first frame of a window;

presenting the first and second medical diagnostic images together concurrently on a single display;

displaying a set of graphic user interface commands at said workstation to enable an operator to manipulate the medical diagnostic images;

accepting said graphic user interface commands upon selection of a command by an operator at said workstation;

converting said operator selected graphic user interface commands into a set of commands over a network for printing, display or storage of said edited imagery;

presenting a text template upon the graphic user interface;

presenting a text padding area surrounding the display of a medical diagnostic image within a frame;

accepting user text input;

placing said user text input into said text padding area;

displaying said user text input in said text padding area;

presenting a set of text editing commands for editing the contents, size and font, and location of said text within said text padding area;

storing the text template as a text object associated with the medical diagnostic image which the text padding area surrounds;

reading a set of default values; and generating a medical diagnostic imagery transfer command wherein command parameter values are set equal to the default values.

2. The method of claim 1 further comprising the steps of masking a data byte to determine whether a medical image data byte has unused data bits; and setting a single bit in the unused data bits to indicate a pixel represented by the data byte should be highlighted to indicate that an annotation is overlaid on the image.

* * * * *